United States Patent
Endo et al.

(10) Patent No.: US 12,180,767 B2
(45) Date of Patent: Dec. 31, 2024

(54) OPEN/CLOSE CONTROL DEVICE, OPEN/CLOSE CONTROL SYSTEM, OPEN/CLOSE CONTROL METHOD, AND PROGRAM

(71) Applicant: ALPS ALPINE CO., LTD., Tokyo (JP)

(72) Inventors: Shinichi Endo, Miyagi (JP); Kenji Masuzawa, Miyagi (JP); Yuta Hoshikawa, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 487 days.

(21) Appl. No.: 17/457,475

(22) Filed: Dec. 3, 2021

(65) Prior Publication Data

US 2022/0090431 A1     Mar. 24, 2022

Related U.S. Application Data

(63) Continuation of application No. PCT/JP2020/011214, filed on Mar. 13, 2020.

(30) Foreign Application Priority Data

Jun. 24, 2019    (JP) ................................ 2019-116735
Nov. 26, 2019    (JP) ................................ 2019-213651

(51) Int. Cl.
    *E05F 15/41*        (2015.01)
    *E05F 15/695*       (2015.01)
                       (Continued)

(52) U.S. Cl.
    CPC ............ *E05F 15/41* (2015.01); *E05F 15/695* (2015.01); *E05F 15/697* (2015.01); *E05F 15/73* (2015.01);
                       (Continued)

(58) Field of Classification Search
    CPC ....... E05F 15/41; E05F 15/695; E05F 15/697; E05F 15/73; G05B 19/042;
                       (Continued)

(56) References Cited

U.S. PATENT DOCUMENTS

| | | |
|---|---|---|
| 10,815,714 B2 | 10/2020 | Aoshima |
| 2012/0191305 A1 | 7/2012 | Ersek et al. |
| 2018/0002969 A1 | 1/2018 | Endo et al. |

FOREIGN PATENT DOCUMENTS

| | | | |
|---|---|---|---|
| CN | 102598453 | 7/2012 | |
| DE | 202011110184 U1 * | 4/2013 | ........... H02H 7/0851 |

(Continued)

OTHER PUBLICATIONS

JP 2002364245 A—English (Year: 2002).*

(Continued)

*Primary Examiner* — Ian Jen
*Assistant Examiner* — Renee LaRose
(74) *Attorney, Agent, or Firm* — IPUSA, PLLC

(57) ABSTRACT

An open/close control device which detects pinching by an open/close body due to driving of a motor, includes a computing unit configured to compute an acceleration term based on a change in a rotational period of the motor, and a load applied to the motor based on the acceleration term, based on a signal indicating the rotation period of the motor, a determination unit configured to determine that the pinching by the open/close body occurred, when the load computed by the computing unit exceeds a predetermined determination value, and a determination value adjusting unit configured to increase the determination value when a local maximum value of the acceleration term exceeds a predetermined threshold value, or the acceleration term becomes less than or equal to a predetermined reference value, or the (Continued)

acceleration term decrease by a predetermined value or more, during a certain period after starting the motor.

14 Claims, 20 Drawing Sheets

(51) Int. Cl.
  *E05F 15/697* (2015.01)
  *E05F 15/73* (2015.01)
  *G05B 19/042* (2006.01)
(52) U.S. Cl.
  CPC ...... *G05B 19/042* (2013.01); *E05Y 2201/434* (2013.01); *E05Y 2400/554* (2013.01); *E05Y 2900/55* (2013.01); *G05B 2219/25257* (2013.01)
(58) Field of Classification Search
  CPC .... G05B 2219/25257; E05Y 2201/434; E05Y 2400/554; E05Y 2900/55; B60J 1/00
  See application file for complete search history.

(56) References Cited

FOREIGN PATENT DOCUMENTS

| JP | 2001-082028 | | 3/2001 | |
| JP | 2002364245 A | * | 12/2002 | |
| JP | 2007270607 A | * | 10/2007 | ............. H02H 3/006 |
| JP | 2013-217068 | | 10/2013 | |
| JP | 2018-003426 | | 1/2018 | |
| JP | 2018-009316 | | 1/2018 | |
| JP | 2018-197427 | | 12/2018 | |

OTHER PUBLICATIONS

JP2007270607—English (Year: 2007).*
DE 202011110184 U1—English trans) (Year: 2013).*
International Search Report for PCT/JP2020/011214 mailed on Jun. 9, 2020.
Chinese Office Action for CN202080046035.2 mailed on Oct. 8, 2022.

* cited by examiner

OPEN/CLOSE CONTROL DEVICE, OPEN/CLOSE CONTROL SYSTEM, OPEN/CLOSE CONTROL METHOD, AND PROGRAM

CROSS-REFERENCE TO RELATED APPLICATIONS

This application is a continuation application of International Application No. PCT/JP2020/011214 filed on Mar. 13, 2020 and designated the U.S., which is based upon and claims priority to Japanese Patent Applications No. 2019-116735 filed on Jun. 24, 2019, and No. 2019-213651 filed on Nov. 26, 2019, the entire contents of which are incorporated herein by reference.

BACKGROUND OF THE INVENTION

1. Field of the Invention

The present invention relates to open/close control devices, open/close control systems, open/close control methods, and programs.

2. Description of the Related Art

Conventionally, as a control method for controlling an open/close operation of an open/close body, such as a power window or the like mounted in a vehicle, such as an automobile or the like, for example, there is a known control method (hereinafter referred to as "pinching prevention control") for preventing an object from being pinched by stopping the open/close operation, reversing the open/close operation, or the like of the open/close body when the pinching of the object by the open/close body is detected.

With regard to such a pinching prevention control, Japanese Laid-Open Patent Publication No. 2018-197427, for example, describes a technique for an open/close control device which computes a load of the open/close operation of the open/close body, determines that the object is pinched by the open/close body when the computed load exceeds a pinching threshold value, and temporarily increases the pinching threshold value when a reduction in the computed load per predetermined time exceeds an initial reduction threshold value.

However, the present inventors have found that, during the pinching prevention control, the load on a motor may temporarily increase due to an unstable operation of the motor immediately after the motor is started, thereby causing the open/close control device to erroneously determine that the pinching of the object occurred and activate the pinching prevention operation of the open/close body. In particular, the present inventors have found that the load applied to the motor varies depending on whether or not slackness exists in a regulator which drives the open/close body, and may affect the determination of the pinching of the object.

As a method of avoiding such a situation, it is conceivable to increase a determination value for determining the pinching of the object, however, if the determination value is not increased appropriately, the detection timing of the pinching may be delayed when the pinching of the object actually occurs.

SUMMARY OF THE INVENTION

Accordingly, one object according to one aspect of the embodiments is to provide an open/close control device, an open/close control system, an open/close control method, and a program, which can increase the accuracy of determining the pinching of the object immediately after the motor is started.

According to one aspect of the embodiments, an open/close control device which detects pinching by an open/close body due to driving of a motor, may include a storage device configured to store a program; and a processor configured to execute the program, and perform a process including computing an acceleration term based on a change in a rotational period of the motor, and a load applied to the motor based on the acceleration term, based on a signal indicating the rotation period of the motor, determining that the pinching by the open/close body occurred, when the load computed by the computing exceeds a predetermined determination value, and adjusting the determination value by increasing the determination value when a local maximum value of the acceleration term exceeds a predetermined threshold value during a certain period after starting the motor.

DETAILED DESCRIPTION

The present inventors have found a need for a technique which can increase the accuracy of determining the pinching of the object immediately after the motor is started, by appropriately increasing the determination value so as not to erroneously determine the pinching of the object and so as not to delay the detection timing of the pinching.

Hereinafter, one embodiment will be described with reference to the drawings.

(System Configuration of Open/Close Control System 1)

Figure 1:
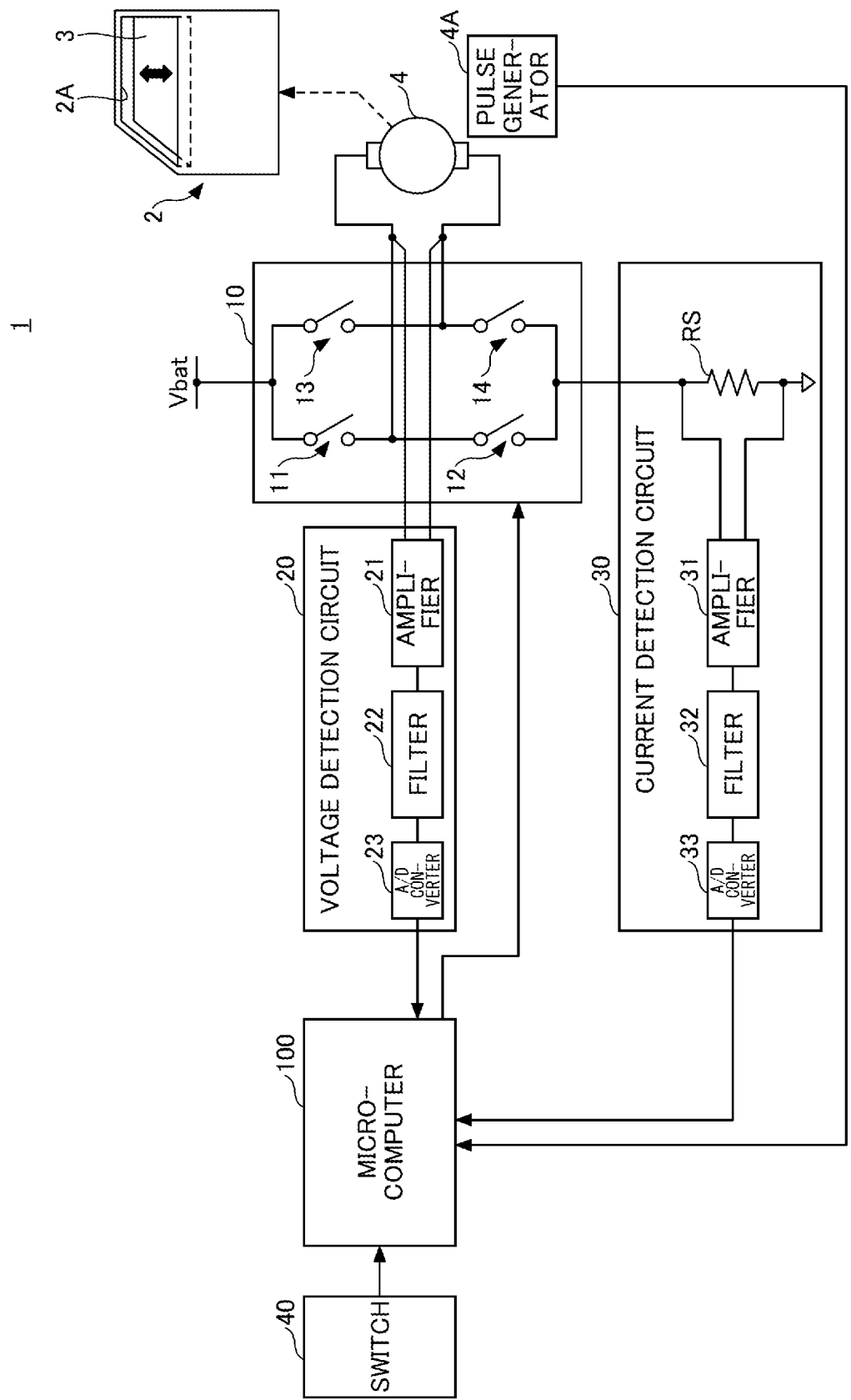
FIG. 1 is a diagram illustrating a system configuration of an open/close control system according to one embodiment of the present invention.

FIG. 1 is a diagram illustrating a system configuration of an open/close control system 1 according to one embodiment of the present invention. The open/close control system 1 illustrated in FIG. 1 is used in a vehicle to control an open/close operation of a power window 3 provided in the vehicle, by controlling an operation of a motor 4.

As illustrated in FIG. 1, the power window 3 is provided to freely open in downward and close in upward directions, with respect to a window frame 2A of a door 2 provided on the vehicle. When the vehicle includes a plurality of power windows 3, the open/close control system 1 may include each of the constituent elements illustrated in FIG. 1 with respect to each of the plurality of power windows 3, to perform a similar control with respect to each of the plurality of power windows 3.

As illustrated in FIG. 1, the open/close control system 1 includes a motor drive circuit 10, a voltage detection circuit 20, a current detection circuit 30, a switch 40, and a microcomputer 100.

The switch 40 is manipulated by a user for performing a switch operation to open/close the power window 3. For example, the switch 40 is provided at a position (for example, door, center console, or the like) in the vehicle enabling manipulation of the switch 40 by the user. The switch 40 can be manipulated to perform an open operation to open the power window 3, and a close operation to close the power window 3. When the open operation or the close operation is performed by the user, the switch 40 outputs an operation signal according to the open operation or the close operation to the microcomputer 100.

The microcomputer 100 is an example of an "open/close control device", and when the switch operation is performed by the user with respect to the switch 40, the microcomputer 100 supplies a control signal to the motor drive circuit 10 according to the switch operation, and controls the operation of the motor 4 to cause the power window 3 to perform the open/close operation. In this state, the microcomputer 100 can determine whether or not pinching by the power window 3 occurred, based on a drive voltage V of the motor 4 detected by the voltage detection circuit 20, and a pulse signal output from a pulse generator 4A and indicating an amount of rotation of a rotating shaft of the motor 4. When the microcomputer 100 determines that the pinching by the power window 3 occurred, the microcomputer 100 can perform a predetermined pinching prevention control with respect to the power window 3.

The motor drive circuit 10 drives the motor 4 by applying the drive voltage to the motor 4 according to the control signal supplied from the microcomputer 100. In the example illustrated in FIG. 1, the motor drive circuit 10 is configured to include four switching elements 11 through 14 forming a full bridge circuit. The switching element 11 and the switching element 12 are connected in series between a power supply voltage Vbat supplied from a battery or the like, and the ground. The switching element 13 and switching element 14 are connected in series between the power supply voltage Vbat and the ground, and are provided in parallel with respect to the switching element 11 and switching element 12. One input terminal of the motor 4 is connected between the switching element 11 and the switching element 12. The other input terminal of the motor 4 is connected between the switching element 13 and the switching element 14. The motor drive circuit 10 can apply, to the two input terminals of the motor 4, the drive voltage having a different polarity according to a rotating direction of the rotating shaft of the motor 4 (that is, the open/close direction of the power window 3), by controlling the switching operation of the four switching elements 11 through 14 according to the control signal supplied from the microcomputer 100.

The motor 4 rotates in the rotating direction according to the polarity of the drive voltage applied to the two input terminals. Accordingly, the motor 4 opens and closes the power window 3 through a regulator (not illustrated) provided between the rotating shaft and the power window 3. For example, a DC motor may be used for the motor 4. In addition, the motor 4 includes the pulse generator 4A. The pulse generator 4A outputs the pulse signal indicating the amount of rotation of the rotating shaft of the motor 4. For example, a Hall element may be used for the pulse generator 4A. The pulse generator 4A outputs the pulse signal (an example of a "signal indicating a rotational period of the motor") every time the rotating shaft of the motor 4 rotates by a predetermined angle. For example, the pulse generator 4A outputs the pulse signal every time the rotating shaft of the motor 4 rotates by 90°. In this case, the pulse generator 4A outputs four pulse signals every time the rotating shaft of the motor 4 makes one revolution.

The voltage detection circuit 20 detects the drive voltage V of the motor 4, and outputs a signal indicating the drive voltage V of the motor 4. In the example illustrated in FIG. 1, the voltage detection circuit 20 is configured to include an amplifier 21, a filter 22, and an A/D converter 23. The amplifier 21 amplifies the drive voltage V applied to the two input terminals of the motor 4 by a predetermined gain. The filter 22 eliminates a switching frequency component from a voltage output from the amplifier 21. The A/D converter 23 outputs a digital signal indicating a voltage output from the filter 22, as the signal indicating the drive voltage V of the motor 4.

The current detection circuit 30 detects a current Im flowing to the motor 4, and outputs a signal indicating the current Im flowing to the motor 4. In the example illustrated in FIG. 1, the current detection circuit 30 is configured to include a shunt resistor RS, an amplifier 31, a filter 32, and an A/D converter 33. The shunt resistor RS is provided in a current path between the motor drive circuit 10 and the ground. The amplifier 31 amplifies the voltage generated across the shunt resistor RS by a predetermined gain. The filter portion 32 eliminates a switching frequency component from a voltage output from the amplifier 31. The A/D converter 33 outputs a digital signal indicating a voltage output from the filter 32, as the signal indicating the current Im flowing to the motor 4.

(Hardware Configuration of Microcomputer 100)

Figure 2:
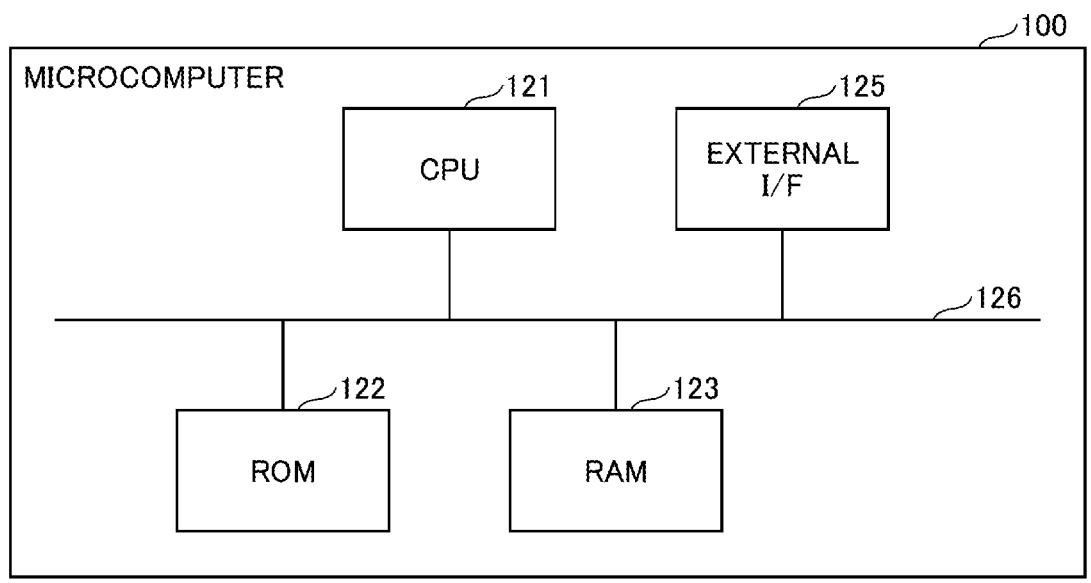
FIG. 2 is a diagram illustrating a hardware configuration of a microcomputer according to one embodiment of the present invention.

FIG. 2 is a diagram illustrating a hardware configuration of the microcomputer 100 according to one embodiment of the present invention. As illustrated in FIG. 2, the microcomputer 100 includes a Central Processing Unit (CPU) 121, a Read Only Memory (ROM) 122, a Random Access Memory (RAM) 123, and an external Interface (I/F) 125. Each hardware is interconnected via a bus 126.

The CPU 121 is an example of a processor which controls the operation of the microcomputer 100, by executing various programs stored in the ROM 122 which is an example of a storage device. The ROM 122 is a non-volatile memory. For example, the ROM 122 stores the programs executed by the CPU 121, data required by the CPU 121 to execute the programs, or the like. The RAM 123 is a main storage, such as a Dynamic Random Access Memory (DRAM), a Static Random Access Memory (SRAM), or the like. For example, the RAM 123 functions as a work area used by the CPU 121 when the CPU 121 executes the program. The external I/F 125 controls the input and output of data with respect to the motor drive circuit 10, the voltage detection circuit 20, the current detection circuit 30, and the switch 40.

(Functional Configuration of Microcomputer 100)

Figure 3:
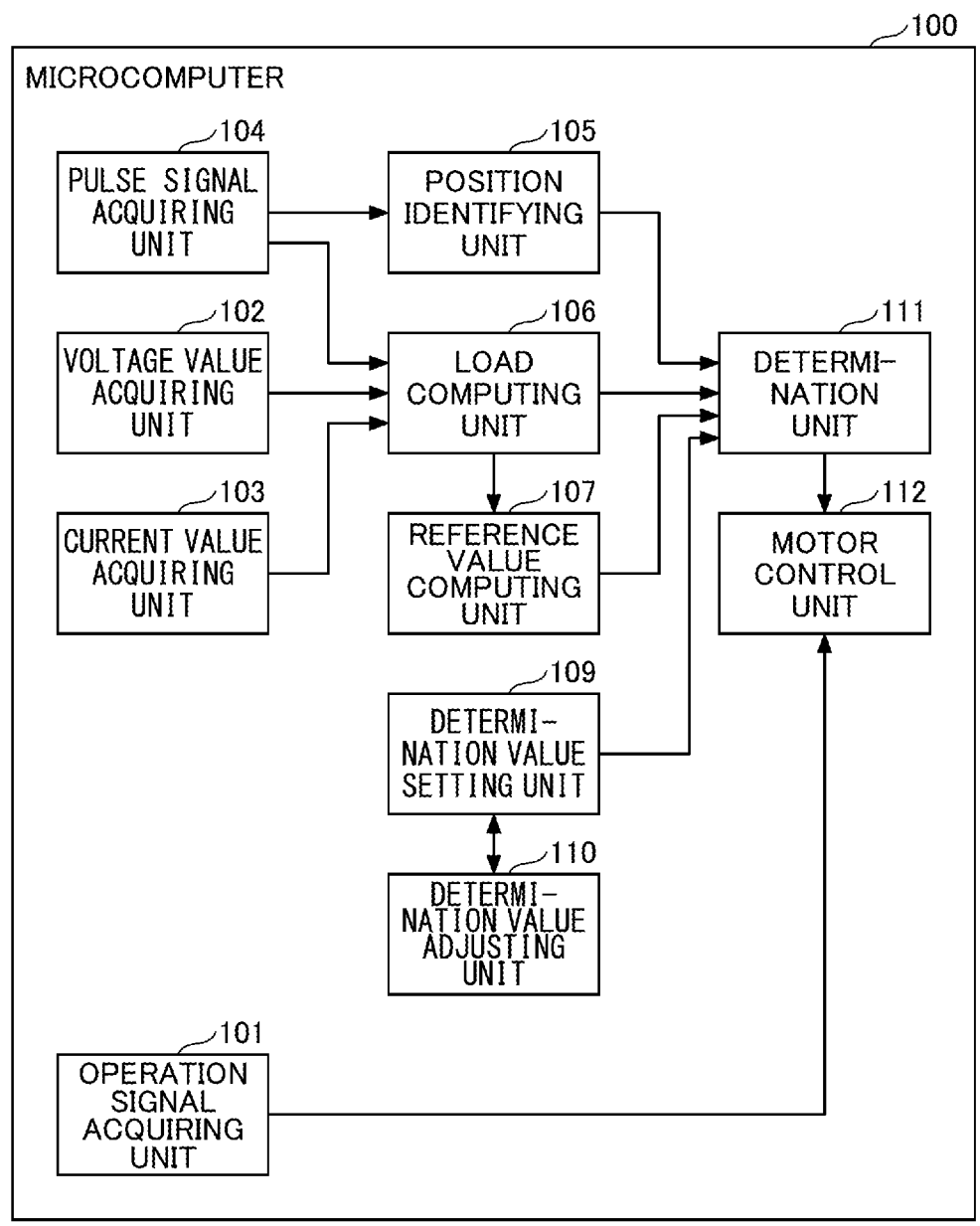
FIG. 3 is a diagram illustrating a functional configuration of the microcomputer according to one embodiment of the present invention.

FIG. 3 is a diagram illustrating a functional configuration of the microcomputer 100 according to one embodiment of the present invention. As illustrated in FIG. 3, the microcomputer 100 includes an operation signal acquiring unit 101, a voltage value acquiring unit 102, a current value acquiring unit 103, a pulse signal acquiring unit 104, a position identifying unit 105, a load computing unit 106, a reference value computing unit 107, a determination value setting unit 109, a determination value adjusting unit 110, a determination unit 111, and a motor control unit 112.

Each function of the microcomputer 100 illustrated in FIG. 3 is performed by executing the program stored in the ROM 122 of the microcomputer 100 by the CPU 121, for example. This program may be provided in a state preinstalled in the microcomputer 100, or may be installed in the microcomputer 100 from the outside. In the latter case, the program may be provided in an external storage medium (for example, a USB memory, a memory card, a CD-ROM, or the like), or may be downloaded from a server on a network (for example, the Internet, or the like).

The operation signal acquiring unit 101 acquires an operation signal output from the switch 40. The voltage value acquiring unit 102 acquires the signal indicating the drive voltage V of the motor 4 output from the voltage detection circuit 20. The current value acquiring unit 103 acquires the signal indicating the current Im flowing to the motor 4 output from the current detection circuit 30. The pulse signal acquiring unit 104 acquires the pulse signal indicating the amount of rotation of the rotating shaft of the motor 4 output from the pulse generator 4A.

The position identifying unit 105 determines an open/close position (height position within the window frame 2A) of the power window 3, based on the pulse signal acquired by the pulse signal acquiring unit 104. For example, in this embodiment, the open/close position of the power window 3 is indicated by a count value (hereinafter, "pulse count value") of the pulse signal output from the pulse generator 4A. More particularly, when the power window 3 is in a fully closed position, the pulse count value is set to "0", and the pulse count value is gradually increased as the power window 3 moves downward with the open operation. Accordingly, the position identifying unit 105 uses the generated number of pulse signals acquired by the pulse signal acquiring unit 104, as an amount of movement of the power window 3. Further, the position identifying unit 105 computes the pulse count value indicating the open/close position of the power window 3 after the open/close operation, by adding (in the case of the open operation) or subtracting (in the case of the close operation) the generated number of pulse signals associated with the open/close operation of the power window 3, from the pulse count value indicating the open/close position of the power window 3 before the open/close operation. For this reason, the position identifying unit 105 stores the pulse count value in a memory provided in the microcomputer 100, so that the pulse count value can be read out when performing the next open/close operation, every time the pulse count value indicating the open/close position of the power window 3 after the open/close operation is computed.

The load computing unit 106 computes a load F of the motor 4, based on the pulse signal acquired by the pulse signal acquiring unit 104, and the signal indicating the drive voltage V of the motor 4 acquired by the voltage value acquiring unit 102. For example, the load computing unit 106 computes a load F(n) according to the following formula (1), for every one pulse of the pulse signal acquired by the pulse signal acquiring unit 104, where n denotes a count value of the number of pulses detected from the pulse signal acquired by the pulse signal acquiring unit 104.

[Formula 1]

$$F(n) = F_{torque}(n) + F_{acc}(n) \quad (1)$$

In the above described formula (1), Ftorque (n) denotes a component of the load F(n) dependent on a driving torque of the motor 4. Ftorque(n) may be computed from the following formula (2). In the following description, Ftorque(n) is referred to as a "torque term". In the computation of the torque term, the current Im flowing to the motor 4 output from the current detection circuit 30, may be used.

[Formula 2]

$$F_{torque}(n) = \frac{K_t}{R_m l}\left(V(n) - \frac{2\pi K_e}{T(n)}\right) \quad (2)$$

In the above described formula (2), Kt indicates a torque constant [N·m/A] of the motor 4. In addition, Rm indicates a resistance value [Ω] of the motor 4. Moreover, l indicates the amount of movement [m/rad] of the power window 3 per unit rotation angle of the rotating shaft of the motor 4. Furthermore, V(n) indicates the drive voltage [V] at a count value n (that is, the drive voltage V indicated by the signal acquired by the voltage value acquiring unit 102). In addition, Ke indicates a back electromotive force constant [V·sec/rad] of the motor 4. Moreover, T(n) indicates a pulse period [sec] of the pulse signal at the count value n. The pulse period indicates the time required by the rotating shaft of the motor 4 to make one revolution, and may be derived from the pulse signal acquired by the pulse signal acquiring unit 104.

In the above described formula (1), Facc(n) denotes a component of the load F(n) dependent on an angular acceleration of the motor 4. Facc(n) may be computed from the following formula (3). In the following description, Facc(n) is referred to as an "acceleration term".

The acceleration term Facc(n) is part of the formula for computing the load F(n), and the greater the variation of the load F(n), the greater the absolute value of the acceleration term Facc(n) becomes. On the other hand, positive and negative polarities of the actual angular acceleration of the rotating shaft of the motor 4 are opposite to the positive and negative polarities of the acceleration term Facc(n).

[Formula 3]

$$F_{acc}(n) = -\frac{C}{T(n)}\left(\frac{1}{T(n)} - \frac{1}{T(n-1)}\right) \quad (3)$$

In the above described formula (3), C indicates a predetermined adjustment parameter [N·sec2]. In addition, T(n) indicates the pulse period [sec] of the pulse signal at the pulse count value n. Moreover, T(n−1) indicates the pulse period [sec] of the pulse signal at a pulse count value n−1. According to the above described formula (3), the value of Facc(n) decreases as the angular acceleration of the rotating shaft of the motor 4 decreases.

The reference value computing unit 107 computes a weighted average of the load F(n) computed by the load computing unit 106, as a reference value B(n). More particularly, the reference value computing unit 107 computes the weighted average of a new load F(n) and the reference value B(n−1) computed immediately before, as a new reference value B(n), every time the new load F(n) is computed by the load computing unit 106. The reference value computing unit 107 may compute the reference value B(n) from the following formula (4). In the following formula (4), M indicates a predetermined weight coefficient.

[Formula 4]

$$B(n) = \frac{(M-1) \times B(n-1) + F(n)}{M} \quad (4)$$

The determination value setting unit 109 sets a pinch determination value Fth for determining whether or not the pinching by the power window 3 occurred. For example, the determination value setting unit 109 sets a value obtained by adding a predetermined tolerance α1 with respect to the reference value B(n) computed by the reference value computation unit 107, as the pinch determination value Fth. An appropriate value for the tolerance α1 is obtained in advance by a simulation or the like, and is set to the microcomputer 100.

Figure 5:
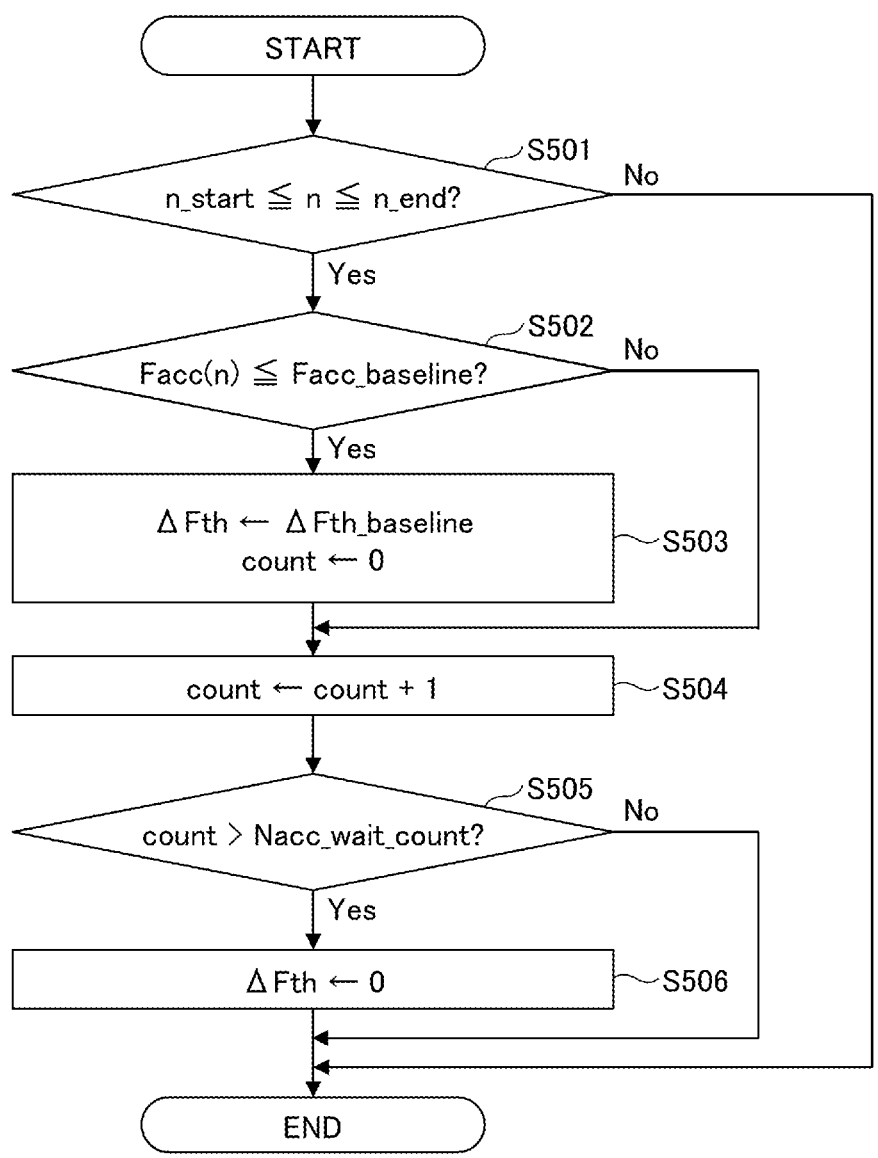
FIG. 5 is a flow chart illustrating procedures of a first start-up determination value adjusting process by a determination value adjusting unit according to one embodiment of the present invention.

The determination value adjusting unit 110 performs a first start-up determination value adjusting process illustrated in detail in FIG. 5, to increase the pinch determination value Fth by a predetermined increment (ΔFth_baseline) for a predetermined third period (Nacc_wait_count), when the acceleration term computed from the above described formula (3) becomes less than or equal to a predetermined reference value Facc_baseline during a predetermined determination period (hereinafter referred to as a "threshold increase determination period") immediately after starting the motor 4.

Figure 6:
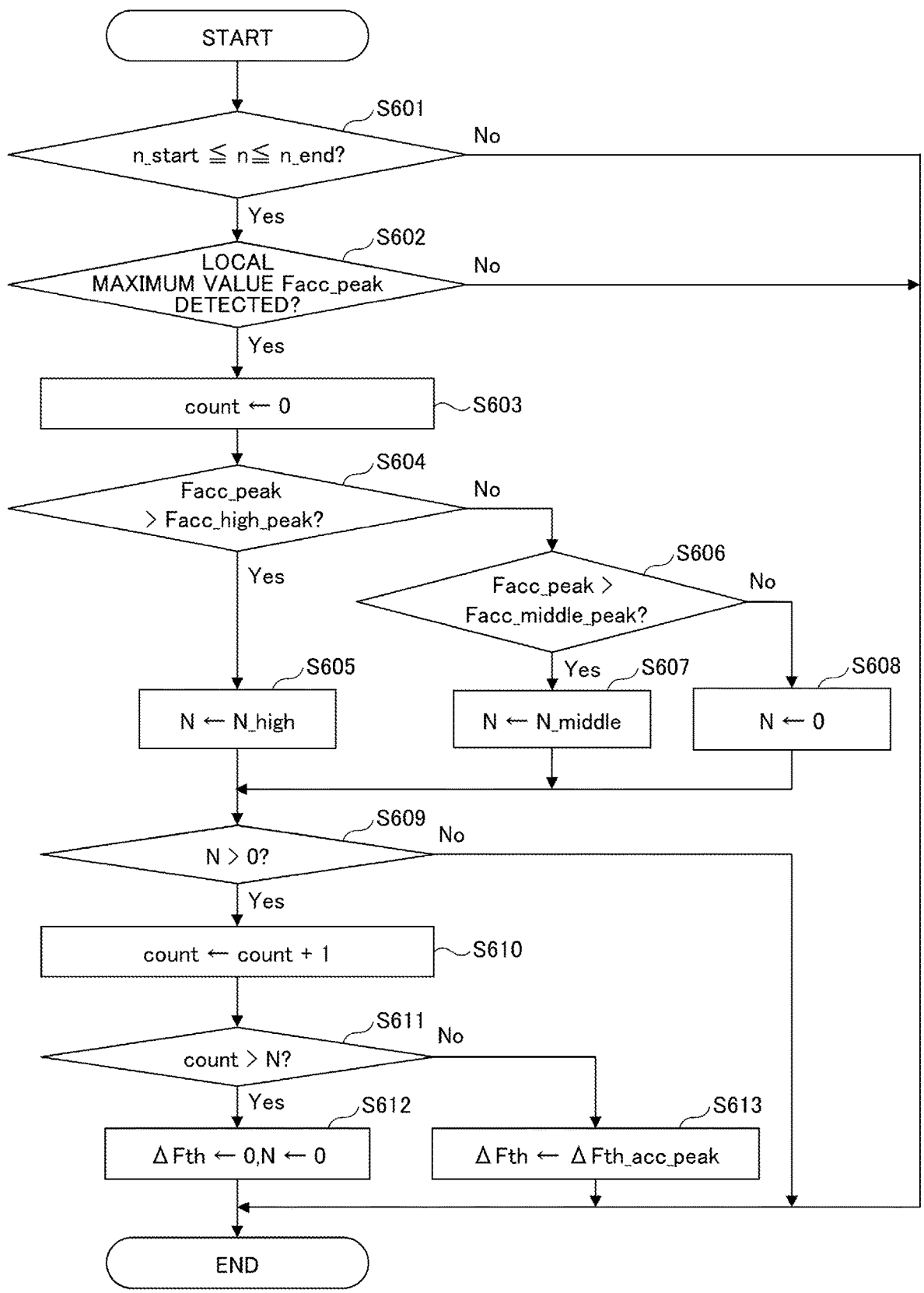
FIG. 6 is a flow chart illustrating procedures of a second start-up determination value adjusting process by the determination value adjusting unit according to one embodiment of the present invention.

In addition, the determination value adjusting unit 110 performs a second start-up determination process illustrated in detail in FIG. 6, to increase the pinch determination value Fth by a predetermined increment (ΔFth_acc_peak) for a predetermined first period (N_high), when a local maximum value of the acceleration term computed from the above described formula (3) exceeds a predetermined first threshold value (Facc_high_peak) during the threshold increase determination period immediately after starting the motor 4. Moreover, the determination value adjusting unit 110 increases the pinch determination value Fth by a predetermined increment (ΔFth_acc_peak) for a predetermined second period (N_middle), when the local maximum value of the acceleration term is less than the first threshold value and exceeds a predetermined second threshold value (Facc_middle_peak) smaller than the predetermined first threshold value.

Figure 15:
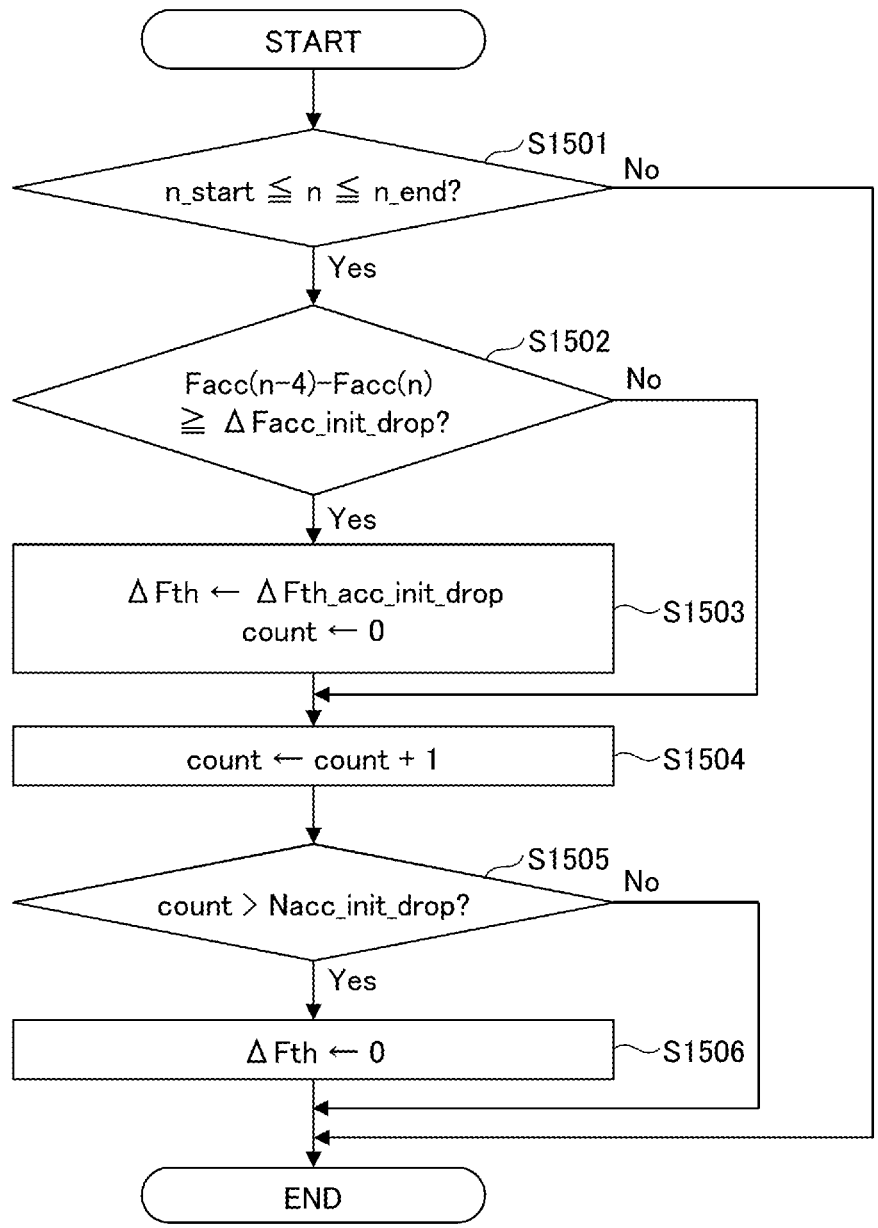
FIG. 15 is a flow chart illustrating procedures of a third start-up determination value adjusting process by the determination value adjusting unit according to one embodiment of the present invention.

Further, the determination value adjusting unit 110 performs a third start-up determination process illustrated in detail in FIG. 15, to increase the pinch determination value Fth by a predetermined increment (ΔFth_acc_init_drop) for a predetermined fourth period (Nacc_init_drop), when the computed value of the current acceleration term computed from the above described formula (3) becomes lower than the computed value of the acceleration term of four counts before computed from the above described formula (3), by a predetermined value (Facc_init_drop) or more (that is, when an amount of decrease of the acceleration term per predetermined unit time exceeds the predetermined threshold value), during the threshold increase determination period immediately after starting the motor 4. The determination value adjusting unit 110 adds the increment of each of the plurality of start-up determination value adjusting processes to the pinch determination value Fth, when the conditions of the plurality of start-up determination value adjusting processes are satisfied simultaneously.

As described above, the determination value adjusting unit 110 temporarily increases the pinch determination value Fth when a peculiar condition is satisfied in a state where no pinching by the power window 3 occurs, thereby reducing an erroneous determination of the pinching by the power window 3 when no pinching by the power window 3 occurs.

The threshold increase determination period is set within a period from the start of the motor 4 until the rotation of the motor 4 stabilizes. According to this embodiment, the period from a time when the motor 4 is started to a time when a predetermined pulse count value n3 (for example, pulse count value of 90 pulses) is counted, is the period until the rotation of the motor 4 stabilizes. A beginning and an end of the first start-up determination value adjusting process, the second start-up determination value adjusting process, and the third start-up determination value adjusting process may be set arbitrarily for each of the power windows 3, for example. The beginning of each start-up determination value adjusting process may coincide with, or differ from, the beginnings of other start-up determination value adjusting processes. Similarly, the end of each start-up determination value adjusting process may coincide with, or differ from, the ends of other start-up determination value adjusting processes.

When the open/close position of the power window 3 is within a predetermined pinching monitoring region, the determination unit 111 determines whether or not the pinching by the power window 3 occurred. For example, when the load F(n) computed by the load computing unit 106 exceeds the pinch determination value Fth set by the determination value setting unit 109, the determination unit 111 determines that the pinching by the power window 3 occurred. On the other hand, when the load F(n) computed by the load computing unit 106 does not exceed the pinch determination value Fth set by the determination value setting unit 109, the determination unit 111 determines that no pinching by the power window 3 occurred. The predetermined pinching monitoring region excludes a region from the fully closed position of the power window 3 to a position separated by a predetermined distance (for example, 4 mm) in a downward direction from the fully closed position.

In the case where the pinch determination value Fth is temporarily increased by the determination value adjusting unit 110, the determination unit 111 determines that the pinching by the power window 3 occurred when the load F(n) computed by the load computing unit 106 exceeds the temporarily increased pinch determination value Fth. On the other hand, when the load F(n) computed by the load computing unit 106 does not exceed the temporarily increased pinch determination value Fth, the determination unit 111 determines that the pinching by the power window 3 has not occurred.

Accordingly, even in a case where the value of the load F(n) computed by the load computing unit 106 temporarily increases due to unstable operation of the motor 4 immediately after the starting the motor 4 until the rotation of the motor 4 stabilizes, even though the pinching by the power window 3 does not occur, the microcomputer 100 according to this embodiment can increase the pinch determination value Fth so that the value of the load F(n) does not exceed the pinch determination value Fth. For this reason, the microcomputer 100 according to this embodiment can prevent the erroneous determination of the pinching by the power window 3.

On the other hand, in a case where the value of the load F(n) computed by the load computing unit 106 increases immediately after the starting the motor 4 until the rotation of the motor 4 stabilizes, due to the pinching by the power window 3 that occurs, the microcomputer 100 according to this embodiment can cause the value of the load F(n) to easily exceed the pinch determination value Fth by not increasing the pinch determination value Fth. For this reason, the microcomputer 100 according to this embodiment can detect the pinching by the power window 3 at a relatively early timing.

The motor control unit 112 controls the open/close operation of the power window 3, by supplying the control signal to the motor 4 and controlling the motor 4, according to the operation signal acquired by the operation signal acquiring unit 101.

For example, when the operation signal for causing the power window 3 to perform the close operation is acquired by the operation signal acquiring unit 101, the motor control unit 112 supplies the control signal for rotating the rotating shaft of the motor 4 in a first direction to the motor 4, so that the power window 3 performs the close operation.

On the other hand, when the operation signal for causing the power window 3 to perform the open operation is acquired by the operation signal acquiring unit 101, the motor control unit 112 supplies the control signal for rotating the rotating shaft of the motor 4 in a second direction, opposite to the first direction, to the motor 4, so that the power window 3 performs the open operation.

In addition, when the position of the power window 3 identified by the position identifying unit 105 is the position within the pinching monitoring region, and the determination unit 111 determines that the pinching by the power window 3 occurred, the motor control unit 112 controls the motor 4 so that the power window 3 performs a predetermined pinching prevention operation.

For example, when the determination unit 111 determines that the pinching by the power window 3 occurred, the motor control unit 112 controls the motor 4 to stop the close operation of the power window 3, and thereafter cause the power window 3 to perform the open operation to move by a predetermined amount to a predetermined open/close position, as the predetermined pinching prevention operation.

(Procedures of Processes of Microcomputer 100)

Figure 4:
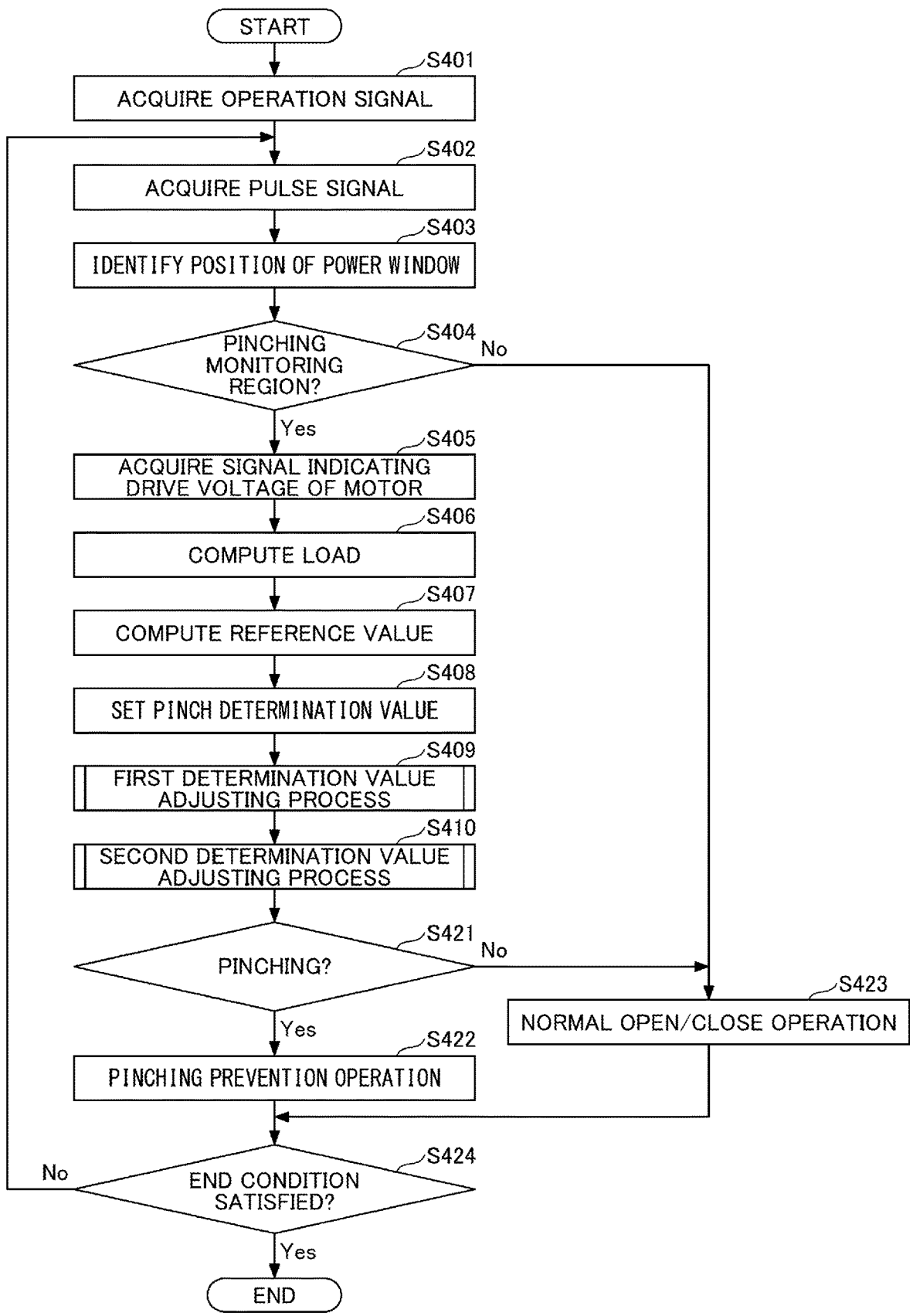
FIG. 4 is a flow chart illustrating procedures of processes of the microcomputer according to one embodiment of the present invention.

FIG. 4 is a flow chart illustrating procedures of processes of the microcomputer 100 according to one embodiment of the present invention.

First, the operation signal acquiring unit 101 acquires the operation signal output from the switch 40 (step S401). Next, the pulse signal acquiring unit 104 acquires the pulse signal indicating the amount of rotation of the rotating shaft of the motor 4 output from the pulse generator 4A (step S402). The position identifying unit 105 identifies the open/close position of the power window 3, based on the pulse signal acquired in step S402 (step S403). For example, in step S403, every time one pulse signal is acquired, the pulse count value n indicating the open/close position of the power window 3 from the start of the motor is incremented by 1.

Next, the position identifying unit 105 determines whether or not the open/close position of the power window 3 identified in step S403 is within the predetermined pinching monitoring region (step S404).

When it is determined in step S404 that the open/close position is not within the predetermined pinching monitoring region (No in step S404), the motor control unit 112 supplies the control signal to the motor 4 and controls the motor 4, according to the operation signal acquired in step S401, so as to control a normal open/close operation (open operation or close operation) of the power window 3 (step S423). Then, the microcomputer 100 advances to the process of step S423.

On the other hand, in step S404, when it is determined that the open/close position is within the predetermined pinching monitoring region (Yes in step S404), the voltage value acquiring unit 102 acquires the signal indicating the drive voltage V of the motor 4 output from the voltage detection circuit 20 (step S405).

Further, the load computing unit 106 computes the load F(n) of the open/close operation of the power window 3, based on the pulse signal acquired in step S402 and the signal indicating the drive voltage V of the motor 4 acquired in step S405 (step S406). In addition, the reference value computing unit 107 computes the weighted average of the load F(n) computed in step S406, as the reference value B(n) (step S407).

Next, the determination value setting unit 109 sets a value obtained by adding the predetermined tolerance α1 with respect to the reference value B(n) computed in step S407, as the pinch determination value Fth (step S408).

Moreover, the determination value adjusting unit 110 performs the determination value adjusting process (the first start-up determination value adjusting process and the second start-up determination value adjusting process) (step S409 and step S410). Accordingly, the determination value adjusting unit 110 temporarily increases the pinch determination value Fth during the threshold increase determination period immediately after the start of the motor 4, when the acceleration term becomes less than or equal to the predetermined reference value, and when the local maximum value of the acceleration term exceeds the predetermined threshold value.

Next, the determination unit 111 determines whether or not the pinching by the power window 3 occurred (step S421). More particularly, when the load F(n) computed in step S406 exceeds the pinch determination value Fth set in step S408, or the pinch determination value Fth temporarily increased in steps S409 and S410, the determination unit 111 determines that the pinching by the power window 3 occurred. On the other hand, when the load F(n) computed in step S406 is less than or equal to the pinch determination value Fth set in step S408, or the pinch determination value Fth temporarily increased in steps S409 and S410, the determination unit 111 determines that no pinching by the power window 3 occurred.

When it is determined in step S421 that the pinching by the power window 3 occurred (Yes in step S421), the motor control unit 112 supplies the control signal to the motor and controls the motor 4, thereby controlling the pinching prevention operation of the power window 3 (step S422). Then, the microcomputer 100 advances the process of step S424.

On the other hand, in step S421, when it is determined that no pinching by the power window 3 occurred (No in step S421), the motor control unit 112 supplies the control signal to the motor 4 and controls the motor 4 according to the operation signal acquired in step S401, thereby controlling the normal open/close operation (open operation or close operation) of the power window 3 (step S423). Then, the microcomputer 100 advances the process of step S424.

Step S424 determines whether or not a predetermined end condition is satisfied. The predetermined end condition is used for ending the operation of the power window 3, such as when the power window 3 is in the fully closed state, when the power window 3 is in the fully open state, when the operation signal from the switch 40 is no longer supplied, or the like, for example.

When it is determined in step S424 that the predetermined end condition is not satisfied (No in step S424), the microcomputer 100 returns the process to step S402. On the other hand, when it is determined in step S424 that the predetermined end condition is satisfied (Yes in step S424), the microcomputer 100 ends the series of processes illustrated in FIG. 4.

(Procedures of First Start-up Determination Value Adjusting Process)

FIG. 5 is a flow chart illustrating the procedures of the first start-up determination value adjusting process by the determination value adjusting unit 110 according to one embodiment of the present invention. FIG. 5 illustrates the procedures of the first start-up determination value adjusting process (step S409) of the flow chart illustrated in FIG. 4 by the determination value adjusting unit 110 in detail. In particular, FIG. 5 illustrates the procedures of the first start-up determination value adjusting process performed by the determination value adjusting unit 110 during the period from the time when the motor 4 is started to the time when the rotation of the motor 4 stabilizes.

In the first start-up determination value adjusting process, the following variables and constants are used.

n: Pulse count value from the start of the motor 4

Facc(n): Computed value of acceleration term for pulse count value n

Facc_baseline: Reference value of the acceleration term

ΔFth: Variable indicating the increment of the pinch determination value Fth

ΔFth_baseline: Set value of the increment of the pinch determination value Fth

Count: Number of counts indicating the duration of the third period in which the pinch determination value Fth is increased Nacc_wait_count: Number of counts defining a length of the third period in which the pinch determination value Fth is increased n_start: Pulse count value indicating the beginning of the threshold increase determination period n_end: Pulse count value indicating the end of the threshold escalation determination period First, the determination value adjusting unit 110 determines whether or not a condition {n_start<=n<=n_end} is satisfied (step S501). The condition {n_start<=n<=n_end} is used to determine whether or not a timing is within the threshold increment determination period. For example, n_start is set to "10", and n_end is set to "50". n is the pulse count value indicating the open/close position of the power window 3 from the start of the motor identified in step S403 illustrated in FIG. 4.

When it is determined in step S501 that the condition {n_start<=n<=n_end} is not satisfied (No in step S501), the determination value adjusting unit 110 ends the series of processes illustrated in FIG. 5.

On the other hand, in step S501, when it is determined that the condition {n_start<=n<=n_end} is satisfied (Yes in step S501), the determination value adjusting unit 110 determines whether or not a condition {Facc(n)<=Facc_baseline} is satisfied (step S502). The condition {Facc(n)<=Facc_baseline} is used to determine whether or not the computed value of the acceleration term has become less than or equal to the predetermined reference value.

When it is determined in step S502 that the condition {Facc(n)<=Facc_baseline} is not satisfied (No in step S502), the determination value adjusting unit 110 advances the process to step S504.

On the other hand, in step S502, when it is determined that the condition {Facc(n)<=Facc_baseline} is satisfied (Yes in step S502), the determination value adjusting unit 110 substitutes the constant ΔFth_baseline into the variable ΔFth, and substitutes "0" into the variable count (step S503). ΔFth_baseline indicates the increment with respect to the pinch determination value Fth. An appropriate value for ΔFth_baseline is obtained in advance by a simulation or the like, and is set to the microcomputer 100. For example, "50 [N]" is set to ΔFth_baseline. Then, the determination value adjusting unit 110 advances the process to step S504.

In step S504, the determination value adjusting unit 110 adds "1" to the variable count. Next, the determination value adjusting unit 110 determines whether or not a condition {count>Nacc_wait_count} is satisfied (step S505). The condition {count>Nacc_wait_count} is used to determine whether or not the period in which the pinch determination value Fth is increased has reached the end of the period. For example, "10" is set to Nacc_wait_count.

When it is determined in step S505 that the condition {count>Nacc_wait_count} is not satisfied (No in step S505), the determination value adjusting unit 110 ends the series of processes illustrated in FIG. 5.

On the other hand, in step S505, when it is determined that the condition {count>Nacc_wait_count} is satisfied (Yes in step S505), the determination value adjusting unit 110 substitutes "0" into the variable ΔFth (step S506), and the series of processes illustrated in FIG. 5 ends.

When the acceleration term becomes less than or equal to the predetermined reference value Facc_baseline during the threshold increase determination period which is set to the period in which the rotation of the motor 4 is unstable, by the series of processes illustrated in FIG. 5, the pinch determination value Fth is increased by a predetermined amount and for a certain period.

(Procedures of Second Start-up Determination Value Adjusting Process)

FIG. 6 is a flow chart illustrating the procedures of the second start-up determination value adjusting process by the determination value adjusting unit 110 according to one embodiment of the present invention. FIG. 6 illustrates the procedures of the second start-up determination value adjusting process (step S410) of the flow chart illustrated in FIG. 4 by the determination value adjusting unit 110 in detail. In particular, FIG. 6 illustrates the procedures of the second start-up determination value adjusting process performed by the determination value adjusting unit 110 during the period from the time when the motor 4 is started to the time when the rotation of the motor 4 stabilizes.

In the second start-up determination value adjusting process, the following variables and constants are used.

n: Pulse count value from the start of the motor 4

ΔFth: Variable indicating the increment of the pinch determination value Fth

ΔFth_acc_peak: Set value of the increment of the pinch determination value Fth

Count: Number of counts indicating the duration of the period in which the pinch determination value Fth is increased Facc_peak: Local maximum value of the acceleration term Facc(n)

Facc_high_peak: First threshold value of the local maximum value of the acceleration term Facc(n)

Facc_middle_peak: Second threshold value of the local maximum value of the acceleration term Facc(n)

N: Variable indicating the end of the period in which the pinch determination value Fth is increased N_high: Set value of a length of the first period in which the pinch determination value Fth is increased N_middle: Set value of a length of the second period in which the pinch determination value Fth is increased First, the determination value adjusting unit 110 determines whether or not a condition {n_start<=n<=n_end} is satisfied (step S601). The condition {n_start<=n<=n_end} is used to determine whether or not a timing is within the threshold increment determination period. For example, "10" is set to n_start, and "25" is set to n_end. n is the pulse count value indicating the open/close position of the power window 3 from the start of the motor identified in step S403 illustrated in FIG. 4.

When it is determined in step S601 that the condition {n_start<=n<=n_end} is not satisfied (No in step S601), the determination value adjusting unit 110 ends the series of processes illustrated in FIG. 6.

On the other hand, in step S601, when it is determined that the condition {n_start<=n<=n_end} is satisfied (Yes in step S601), the determination value adjusting unit 110 determines whether or not the local maximum value Facc_peak is detected (step S602). The local maximum value Facc_peak is the local maximum value of the acceleration term. For example, when both a condition {(Facc(n-2)-ΔFacc_error)<=Facc(n-1)} and a condition {(Facc(n)-ΔFacc_error)<=Facc(n-1)} are satisfied, the determination value adjusting unit 110 determines that the local maximum value Facc_peak has been detected, and determines a local maximum value Facc(n-1) at this timing as being the local maximum value Facc_peak.

When it is determined in step S602 that the local maximum value Facc_peak is not detected (No in step S602), the determination value adjusting unit 110 ends the series of processes illustrated in FIG. 6.

When it is determined in step S602 that the local maximum value Facc_peak is detected (Yes in step S602), the determination value adjusting unit 110 substitutes "0" into the variable count (step S603).

Further, the determination value adjusting unit 110 determines whether or not a condition {Facc_peak>Facc_high_peak} is satisfied (step S604).

When it is determined in step S604 that the condition {Facc_peak>Facc_high_peak} is satisfied (Yes in step S604), the determination value adjusting unit 110 substitutes N_high into the variable N (step S605), and advances the process to step S609.

On the other hand, when it is determined in step S604 that the condition {Facc_peak>Facc_high_peak} is not satisfied (No in step S604), the determination value adjusting unit 110 determines whether or not the condition {Facc_peak>Facc_middle_peak} is satisfied (step S606).

When it is determined in step S606 that the condition {Facc_peak>Facc_middle_peak} is satisfied (Yes in step S606), the determination value adjusting unit 110 substitutes N_middle into the variable N (step S607), and advances the process to step S609.

On the other hand, when it is determined in step S606 that the condition {Facc_peak>Facc_middle_peak} is not satisfied (No in step S606), the determination value adjusting unit 110 substitutes "0" into the variable N (step S608), and advances the process to step S609.

In step S609, the determination value adjusting unit 110 determines whether or not a condition {N>0} is satisfied.

When it is determined in step S609 that the condition {N>0} is not satisfied (No in step S609), the determination value adjusting unit 110 ends the series of processes illustrated in FIG. 6.

On the other hand, when it is determined in step S609 that the condition {N>0} is satisfied (Yes in step S609), the determination value adjusting unit 110 adds "1" to the variable count (step S610). Next, the determination value adjusting unit 110 determines whether or not a condition {count>N} is satisfied (step S611).

When it is determined in step S611 that the condition {count>N} is satisfied (Yes in step S611), the determination value adjusting unit 110 substitutes "0" into the variable ΔFth, and substitutes "0" into the variable N (step S612). Then, the determination value adjusting unit 110 ends the series of processes illustrated in FIG. 6.

On the other hand, when it is determined in step S611 that the condition {count>N} is not satisfied (No in step S611), the determination value adjusting unit 110 substitutes ΔFth_acc_peak into the variable ΔFth (step S613). Then, the determination value adjusting unit 110 ends the series of processes illustrated in FIG. 6. ΔFth_acc_peak indicates the increment with respect to the pinch determination value Fth. An appropriate value for ΔFth_acc_peak is obtained in advance by a simulation or the like, and is set to the microcomputer 100. For example, "80 [N]" is set to $\Delta$Fth_acc_peak.

When the local maximum value of the acceleration term exceeds the predetermined reference value (Facc_high_peak or Facc_middle_peak) during the threshold increase determination period which is set to the period in which the rotation of the motor 4 is unstable, by the series of processes illustrated in FIG. 6, the pinch determination value Fth is increased by a predetermined amount and for a certain period.

(Specific Example of First Start-up Determination Value Adjusting Process)

Figure 7:
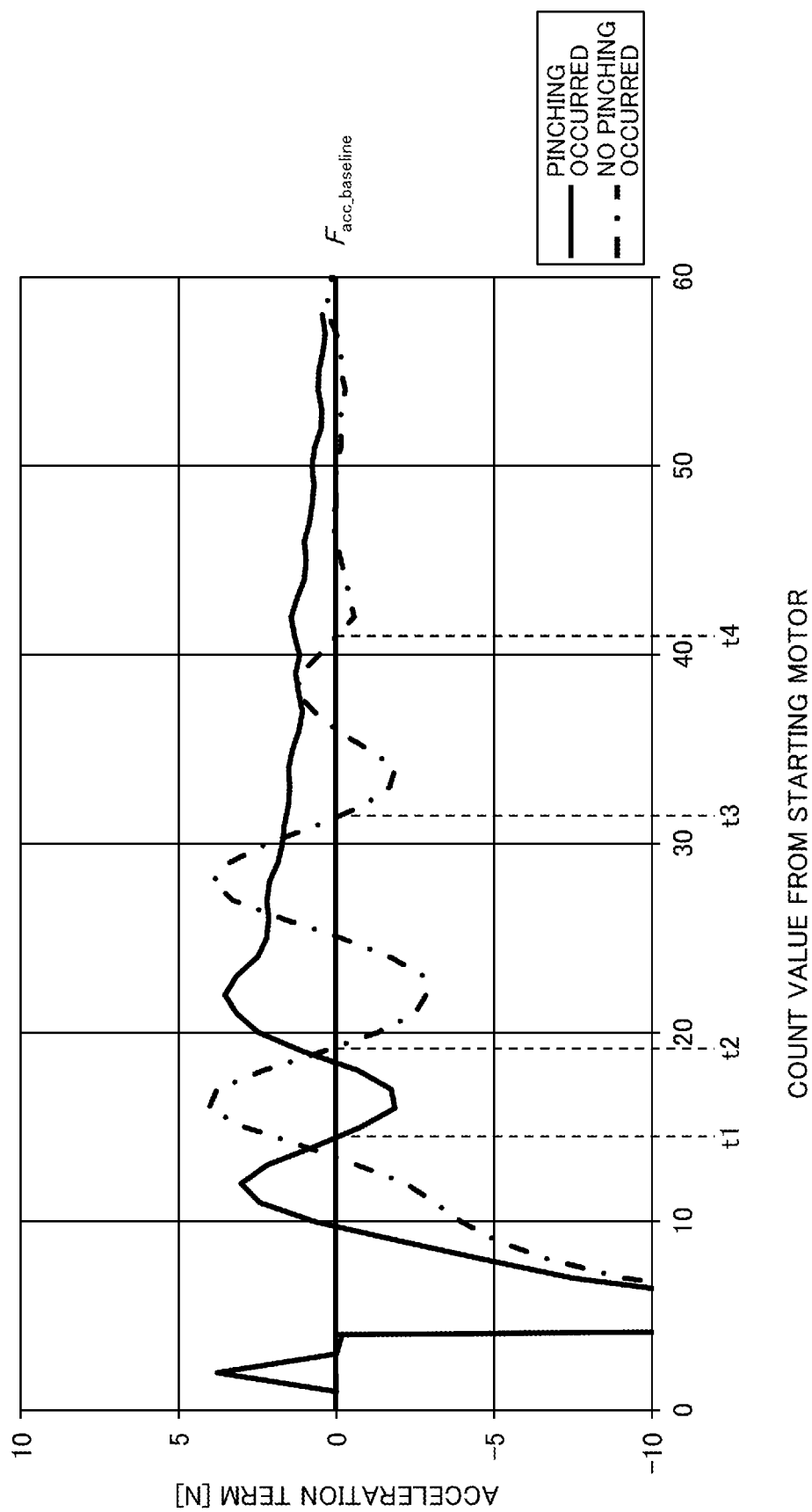
FIG. 7 is a diagram for explaining a specific example of the first start-up determination value adjusting process performed by the determination value adjustment part according to one embodiment of the present invention.

FIG. 7 is a diagram for explaining a specific example of the first start-up determination value adjusting process performed by the determination value adjusting unit 110 according to one embodiment of the present invention. FIG. 7 illustrates a change in acceleration term from the start of the power window 3, for the case where the pinching by the power window 3 occurs, and for the case where no pinching by the power window 3 occurs. In FIG. 7, the change in the acceleration term when the pinching by the power window 3 occurs is indicated by a solid line, and the change in the acceleration term when no pinching by the power window 3 occurs is indicated by a one-dot chain line.

As illustrated in FIG. 7, when the pinching by the power window 3 occurs immediately after starting the motor 4, the acceleration term moves above and below the reference value Facc_baseline during a relatively short period (in the example illustrated in FIG. 7, the period up to a pulse count value of approximately 22). Because the angular acceleration of the motor 4 gradually decreases thereafter, the acceleration term maintains a positive value. The angular acceleration and the acceleration term have opposite polarities.

On the other hand, as illustrated in FIG. 7, when no pinching by the power window 3 occurs, the acceleration term moves above and below the reference value Facc_baseline during a relatively long period (in the example illustrated in FIG. 7, the period up to a pulse count value of approximately 46). This is because, when no pinching by the power window 3 occurs, the rotating shaft of the motor 4 continues to rotate in the direction to close the window, but the acceleration and deceleration are repeated due to the slackness of the regulator of the power window 3. More particularly, the acceleration of the rotating shaft of the motor 4 increases when the amount of slackness of the regulator is large, and the acceleration of the rotating shaft of the motor 4 decreases when the amount of slackness of the regulator is small. Thereafter, when the slackness of the regulator no longer exists, the rotating shaft of the motor 4 rotates at a uniform speed, thereby maintaining the acceleration term to approximately 0.

In view of the different characteristics of the acceleration term, the microcomputer 100 according to this embodiment can more accurately determine whether or not the pinching by the power window 3 occurred, by performing the first determination value adjusting process to adjust the pinch determination value Fth.

As described above, the first determination value adjusting process increases the pinch determination value Fth by a predetermined amount ($\Delta$Fth_baseline) during a certain period (Nacc_wait_count), when the acceleration term becomes less than or equal to the reference value Facc_baseline. This is because, when the acceleration term Facc(n) becomes less than or equal to the reference value Facc_baseline, it is highly likely that no pinching by the power window 3 occurred. In addition, Facc_baseline, $\Delta$Fth_baseline, and Nacc_wait_count are all constants that are appropriately determined in advance by a simulation, a field test, or the like, for each type of power window 3 (for example, for each vehicle type). For example, in the example illustrated in FIG. 7, Facc_baseline is set to "0 [N]", but Facc_baseline is not limited thereto.

For example, in the example illustrated in FIG. 7, when the pinching by the power window 3 occurs, the acceleration term becomes less than or equal to the reference value Facc_baseline only at a timing t1 (approximately at the 15th count). Hence, the pinch determination value Fth is increased by a predetermined amount and for a certain period, only at the timing t1. In other words, when the pinching by the power window 3 occurs, the pinch determination value Fth is not increased after the timing t1, and thus, the load F(n) can more easily exceed the pinch determination value Fth, thereby making it possible to determine that the pinching occurred at a relatively early timing.

On the other hand, in the example illustrated in FIG. 7, when no pinching by the power window 3 occurs, the acceleration term becomes less than or equal to the reference value Facc_baseline at each of timings t2, t3, and t4 (approximately at the 19th, 32nd, and 42nd counts). Hence, the pinch determination value Fth is increased by a predetermined amount and for a certain period, at each of the timings t2, t3, and t4. In other words, when no pinching by the power window 3 occurs, the pinch determination Fth is increased repeatedly even after the timing t1, and for a relatively long period of time, it becomes unlikely for the load F(n) to exceed the pinch determination value Fth, thereby reducing the erroneous determination that the pinching occurred.

(Method For Determining Local Maximum Value of Acceleration Term)

Figure 8:
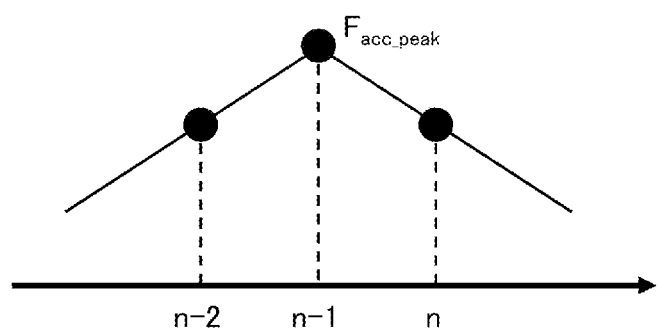
FIG. 8 is a diagram for explaining a method for determining a local maximum value of an acceleration term by the determination value adjusting unit according to one embodiment of the present invention.

FIG. 8 is a diagram for explaining a method of determining the local maximum value of the acceleration term by the determination value adjusting unit 110 according to one embodiment of the present invention.

In the second start-up determination value adjusting process, the determination value adjusting unit 110 first determines the local maximum value of the acceleration term. More particularly, as illustrated in FIG. 8, the local maximum value of the acceleration term becomes larger than the acceleration terms before and after the local maximum value. For this reason, when both a condition {(Facc(n−2)−$\Delta$Facc_error)<=Facc(n−1)} and a condition {(Facc(n)−$\Delta$Facc_error)<=Facc(n−1)}) are satisfied, the determination value adjusting unit 110 determines Facc(n−1) as being the local maximum value Facc_peak.

When a condition {Facc_peak>Facc_high_peak} is satisfied, the determination value adjusting unit 110 increases the pinch determination value Fth for the first period. Alternatively, when a condition {Facc_high_peak>Facc_peak>Facc_middle_peak} is satisfied, the determination value adjusting unit 110 increases the pinch determination value Fth for the second period which is shorter than the first period.

Accordingly, even in a case where an amplitude of the acceleration term Facc(n) varies according to the presence or absence of play in the regulator of the power window 3, the microcomputer 100 according to this embodiment can appropriately perform a pinching determination based on the pinch determination value Fth, for the presence and absence of the regulator play, respectively, by appropriately setting Facc_high_peak and Facc_middle_peak.

The presence of the regulator play may occur when performing an operation to move the power window 3 up after performing an operation to move the power window 3 down, for example. In addition, the absence of the regulator play may occur when performing the operation to move the power window 3 up further after performing the operation to move the power window 3 up, for example.

(Specific Example of Second Determination Value Adjusting Process)

Figure 9:
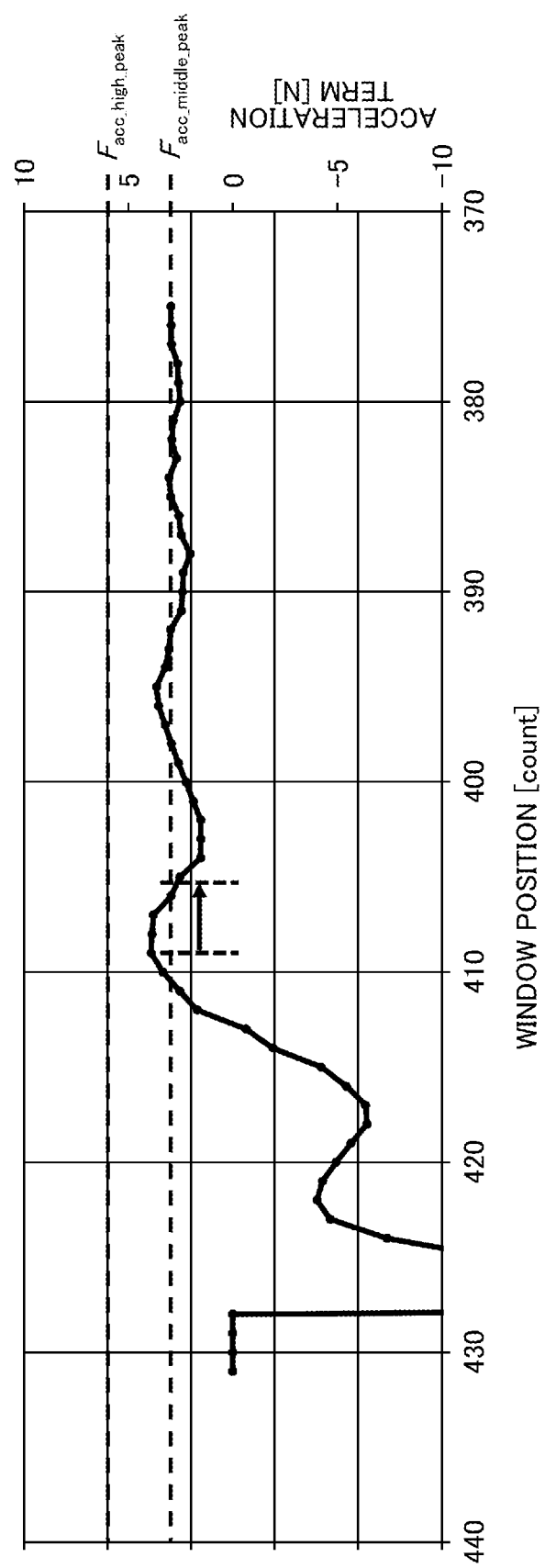
FIG. 9 is a diagram for explaining a specific example of the second start-up determination value adjusting process performed by the determination value adjusting unit according to one embodiment of the present invention.
Figure 10:
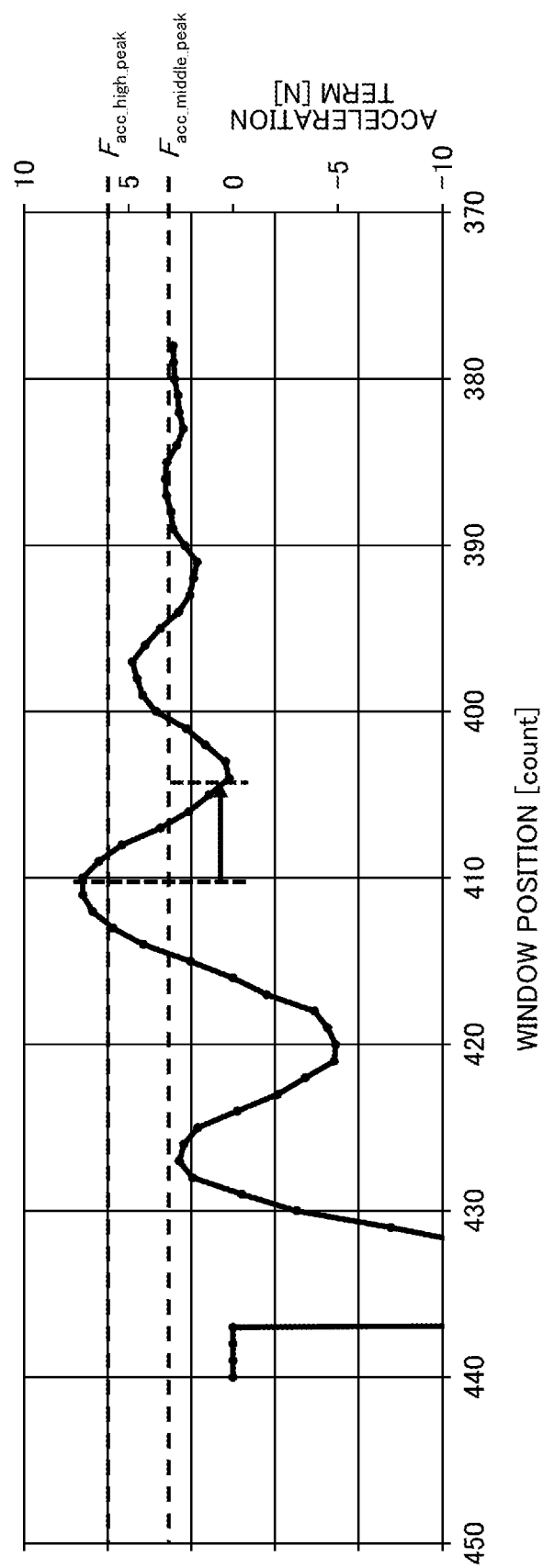
FIG. 10 is a diagram for explaining the specific example of the second start-up determination value adjusting process performed by the determination value adjusting unit according to one embodiment of the present invention.

FIG. 9 and FIG. 10 are diagrams for explaining a specific example of the second start-up determination value adjusting process performed by the determination value adjusting unit 110 according to one embodiment of the present invention.

FIG. 9 illustrates an example of the acceleration term when no rattle of the power window 3 occurs. In the example illustrated in FIG. 9, the local maximum value Facc_peak of the acceleration term occurs when the open/close position of the power window 3 is at the 409th count. This local maximum value Facc_peak is smaller than the threshold value Facc_high_peak, but is larger than the threshold value Facc_middle_peak. In this case, the determination value adjusting unit 110 increases the pinch determination value Fth for the predetermined second period N_middle (for example, 4 counts).

FIG. 10 illustrates an example of the acceleration term when the rattle of the power window 3 occurs. In the example illustrated in FIG. 10, the local maximum value Facc_peak of the acceleration term occurs when the open/close position of the power window 3 is at the 410th count. The local maximum value Facc_peak is larger than the threshold value Facc_high_peak. In this case, the determination value adjusting unit 110 increases the pinch determination value Fth for the predetermined first period N_high (for example, 6 counts) from the timing when this local maximum value Facc_peak is detected.

For example, as illustrated in FIG. 8, the local maximum value of the acceleration term has a tendency to be larger when no pinching by the power window 3 occurs, than when the pinching by the power window 3 occurs. It may be regarded that this tendency is due to the variation of the angular acceleration of the rotating rotating shaft of the motor 4, which is larger when no pinching by the power window 3 occurs, than when the pinching by the power window 3 occurs. Hence, as illustrated in FIG. 9 and FIG. 10, when the threshold value Facc_high_peak or Facc_middle_peak is exceeded, the determination value adjusting unit 110 can determine that it is highly likely that no pinching by the power window 3 occurred, and temporarily increase the determination value Fth can be temporarily increased so as to reduce the erroneous determination that the pinching by the power window 3 occurred.

Particularly, even in a case where the local maximum value Facc_peak of the acceleration term varies depending on the presence or absence of the regulator play of the power window 3, the microcomputer 100 according to this embodiment can appropriately set each of the two threshold values Facc_high_peak and Facc_middle_peak, so as to appropriately set the period in which the pinch determination value Fth is increased for the presence and absence of the regulator play, respectively, thereby appropriately performing the pinching determination based on the pinch determination value Fth.

(First Exemplary Implementation of Control by Microcomputer 100)

Figure 11:
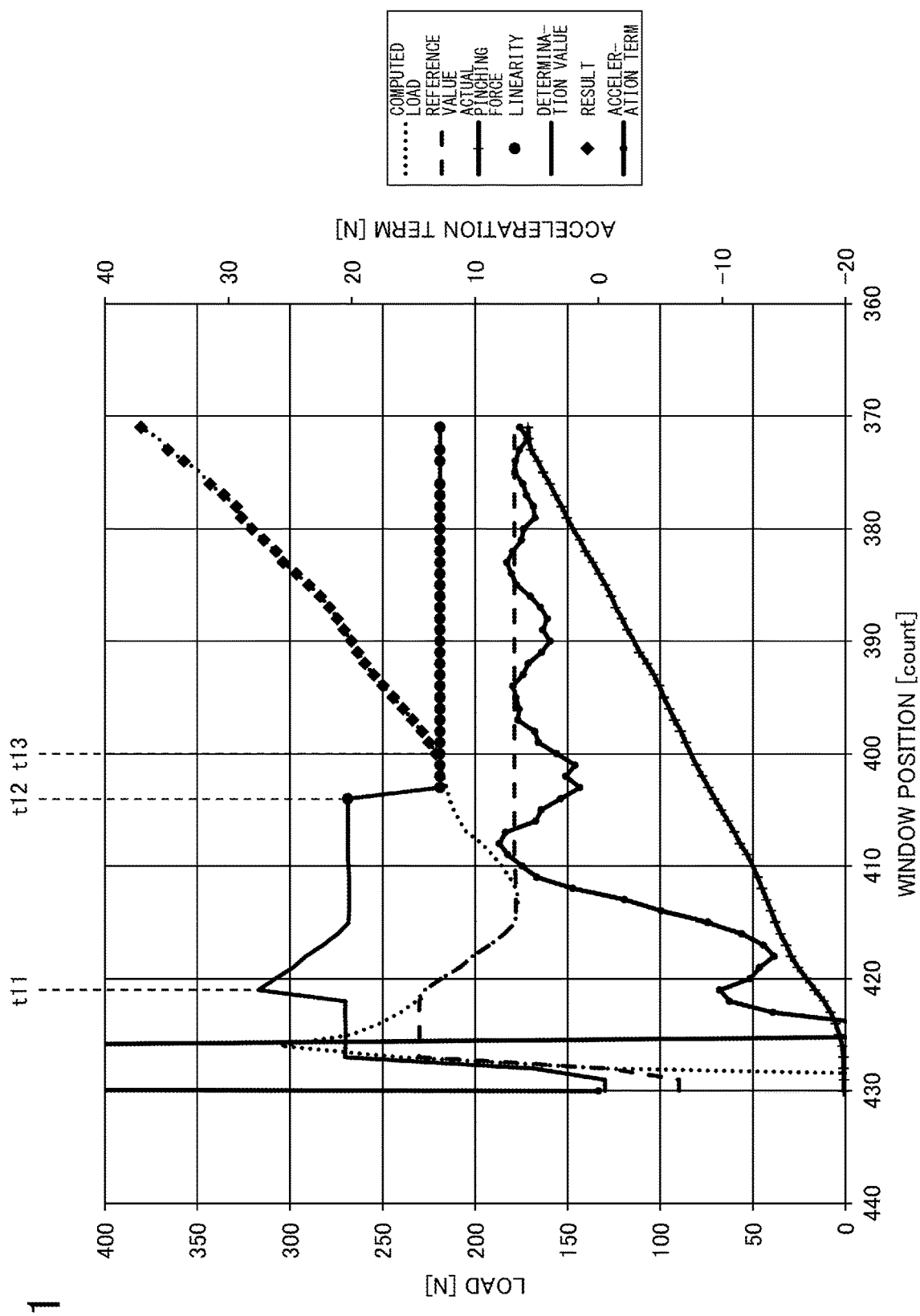
FIG. 11 is a diagram illustrating a first exemplary implementation of a control by the microcomputer according to one embodiment of the invention.

FIG. 11 is a diagram illustrating a first exemplary implementation of control by the microcomputer 100 according to one embodiment of the present invention. FIG. 11 illustrates various computed values (acceleration term, load, or the like) computed by the microcomputer 100 according to this embodiment when the pinching by the power window 3 occurs and no rattle of the power window 3 occurs. In FIG. 11, a timing t11 indicates the start timing of the first start-up determination value adjusting process. In addition, a timing t12 indicates the end timing of the first start-up determination value adjusting process.

As illustrated in FIG. 11, in the first exemplary implementation, because the acceleration term becomes less than or equal to the predetermined reference value Facc_baseline at the timing t11, the pinch determination value Fth is increased by a predetermined amount by the first start-up determination value adjusting process. Then, at the timing t12 after the predetermined third period elapses, the pinch determination value Fth is returned back to its original value. Further, because the load F(n) exceeds the pinch determination value Fth at the timing t13, the determination unit 111 determines, at this timing, that "the pinching by the power window 3 occurred".

In the first exemplary implementation, although the pinch determination value Fth is increased as described above immediately after the start of the motor, it was confirmed that it is possible to detect the pinching by the power window 3 at a relatively early timing because the pinch determination value Fth is returned immediately back to its original value.

(Second Exemplary Implementation of Control by Microcomputer 100)

Figure 12:
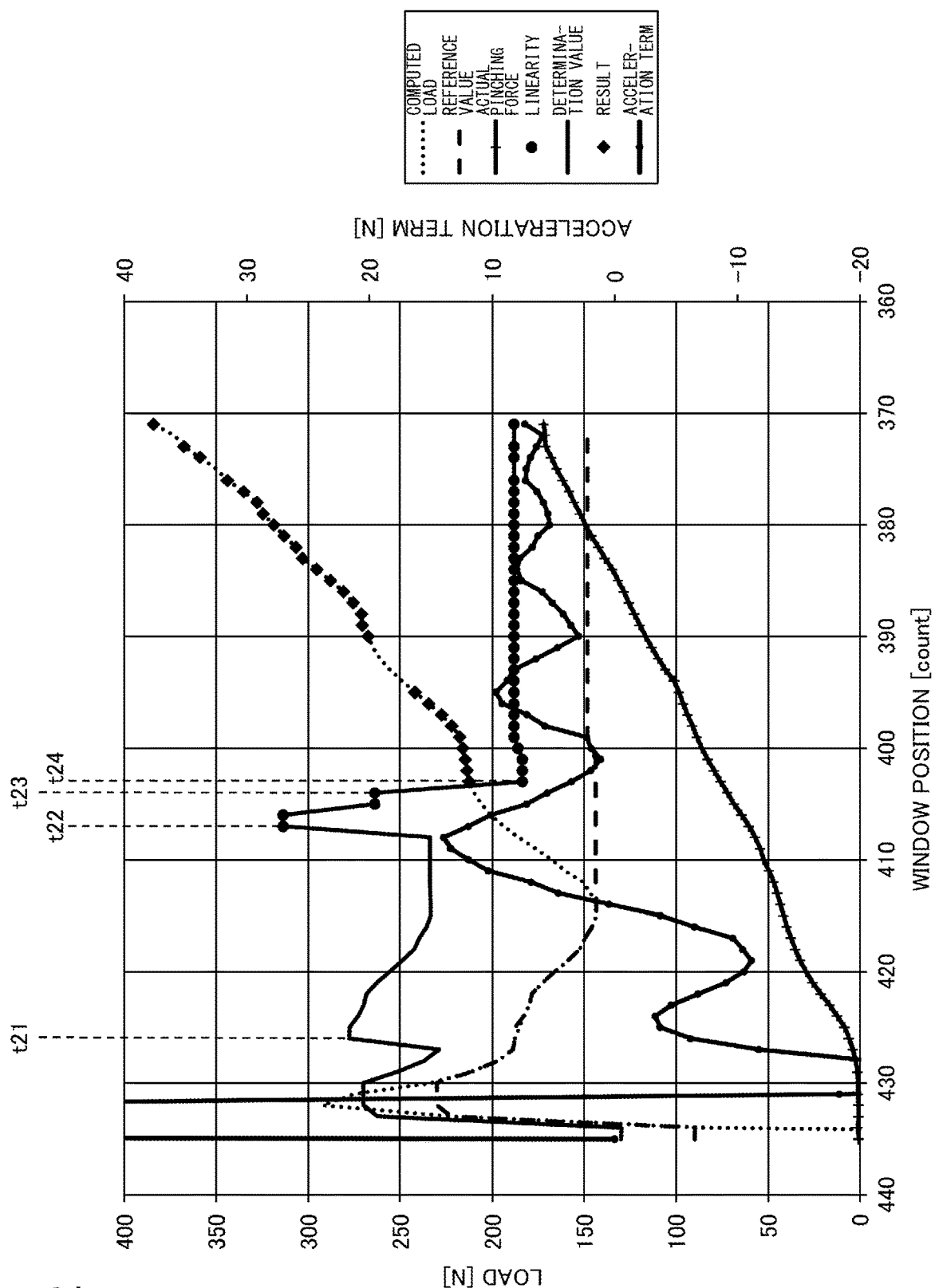
FIG. 12 is a diagram illustrating a second exemplary implementation of the control by the microcomputer according to one embodiment of the present invention.

FIG. 12 is a diagram illustrating a second exemplary implementation of the control by the microcomputer 100 according to one embodiment of the present invention. FIG. 12 illustrates various computed values (acceleration term, load, or the like) computed by the microcomputer 100 according to this embodiment when the pinching by the power window 3 occurs and the rattle of the power window 3 occurs. In FIG. 12, a timing t21 indicates the start timing of the first start-up determination value adjusting process. In addition, a timing t22 indicates the start timing of the second start-up determination value adjusting process. Moreover, a timing t23 indicates the end timing of the first start-up determination value adjusting process. Further, a timing t24 indicates the end timing of the second start-up determination value adjusting process.

As illustrated in FIG. 12, in the second exemplary implementation, because the acceleration term becomes less than or equal to the predetermined reference value Facc_baseline at the timing t21, the pinch determination value Fth is increased by a predetermined amount by the first start-up determination value adjusting process. In addition, because the local maximum value (Facc_peak) of the acceleration term exceeds the predetermined second threshold value (Facc_middle_peak) at the timing t22, the pinch determination value Fth is further increased by a predetermined amount by the second start-up determination value adjusting process.

Then, at the timing t23 after the predetermined third period elapses, the increment of the pinch determination value Fth by the first start-up determination value adjusting process is canceled, and at the timing t24 after the predetermined second period elapses, the increment of the pinch determination value Fth by the second start-up determination value adjusting process is canceled. At the same time, because the load F(n) exceeds the pinch determination value Fth, the determination unit 111 determines, at this timing, that "the pinching by the power window 3 occurred".

In the second exemplary implementation, although the pinch determination value Fth is increased as described above immediately after the start of the motor, it was confirmed that it is possible to detect the pinching by the power window 3 at a relatively early timing because the pinch determination value Fth is returned immediately back to its original value.

(Third Exemplary Implementation of Control by Microcomputer 100)

Figure 13:
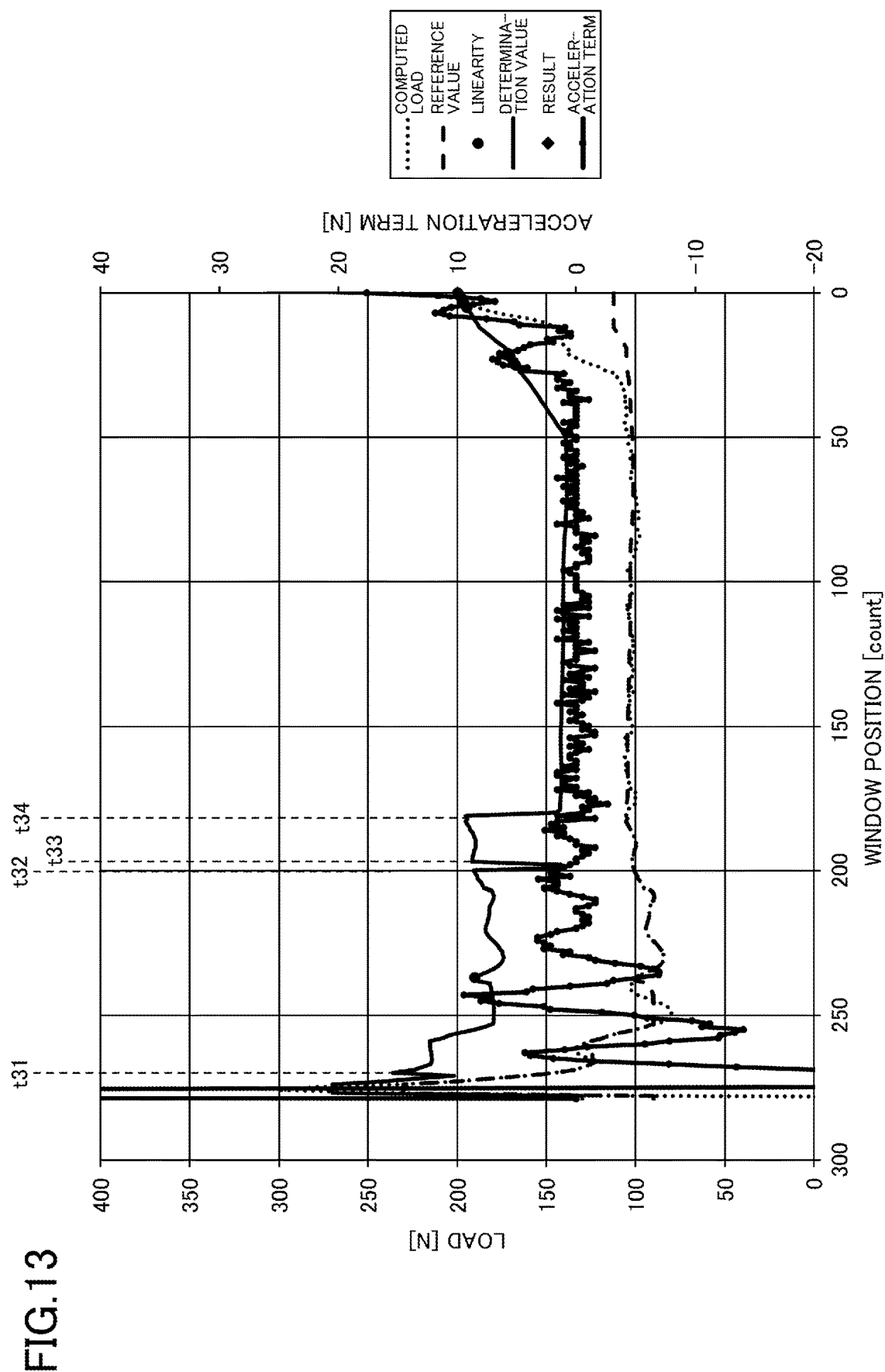
FIG. 13 is a diagram illustrating a third exemplary implementation of the control by the microcomputer according to one embodiment of the present invention.

FIG. 13 is a diagram illustrating a third exemplary implementation of the control by the microcomputer 100 according to one embodiment of the present invention. FIG. 13 illustrates various computed values (acceleration term, load, or the like) computed by the microcomputer 100 according to this embodiment when no pinching by the power window 3 occurs and no rattle of the power window 3 occurs. In FIG. 13, a timing t31 indicates the start timing of the first start time determination value adjusting process (first time). In addition, a timing t32 indicates the end timing of the first start-up determination value adjusting process (first time). Moreover, a timing t33 indicates the start timing of the first start-up determination value adjusting process (second time). Further, a timing t34 indicates the end timing of the first start-up determination value adjusting process (second time).

As illustrated in FIG. 13, in the third exemplary implementation, because the acceleration term becomes less than or equal to the predetermined reference value Facc_baseline at the timing t31, the pinch determination value Fth is increased by a predetermined amount by the first start-up determination value adjusting process (first time). Then, at the timing t32 after the predetermined third period elapses, the pinch determination value Fth is returned back to its original value.

Thereafter, because the acceleration term again becomes less than or equal to the predetermined reference value Facc_baseline at the timing t33, the pinch determination value Fth is increased by a predetermined amount by the first start-up determination value adjusting process (second time). Then, at the timing t34 after the predetermined third period elapses, the pinch determination value Fth is returned back to its original value.

In this third exemplary implementation, because the pinch determination value Fth is increased appropriately as described above, it was confirmed that the load F(n) will not exceed the pinch determination value Fth, and for this reason, the erroneous determination that the pinching by the power window 3 occurred can be prevented.

As described above, the microcomputer 100 according to this embodiment includes the load computing unit 106 which computes the acceleration term Facc(n) based on a change in the rotational period of the motor 4, and the load F(n) applied to the motor 4 based on the acceleration term Facc(n), based on the signal indicating the rotational period of the motor 4, the determination unit 111 which determines that the pinching by the power window 3 occurred when the load F(n) computed by the load computing unit 106 exceeds the pinch determination value Fth, and the determination value adjusting unit 110 which increases the pinch determination value Fth when the local maximum value of the acceleration term Facc(n) exceeds the predetermined threshold value during the certain period after starting the motor 4.

Accordingly, the microcomputer 100 according to this embodiment can detect a peculiar phenomenon in which the local maximum value of the acceleration term exceeds the predetermined threshold value, in the case where the power window 3 is driven through the regulator which may include the slackness and no pinching by the power window 3 occurs. When this phenomenon is detected, the microcomputer 100 according to this embodiment temporarily increases the pinch determination value Fth, so that it becomes unlikely for the load F(n) to exceed the pinch determination value Fth. For this reason, the microcomputer 100 according to this embodiment can prevent the erroneous determination that the pinching by the power window 3 occurred, when the pinching by the power window 3 has not occurred. Hence, the microcomputer 100 according to this embodiment can increase the accuracy of determining the pinching of the object immediately after starting the motor 4.

In the microcomputer 100 of this embodiment, the load computing unit 106 can compute the acceleration term Facc(n), and the torque term Ftorque(n) based on the voltage applied to the motor 4 and the rotational period of the motor 4, and compute the load F(n) applied to the motor 4 by adding the torque term Ftorque(n) to the acceleration term Facc(n).

Accordingly, the microcomputer 100 according to this embodiment can further increase the accuracy of computing the load F(n) applied to the motor 4. Hence, the microcomputer 100 according to this embodiment can determine whether or not the pinching by the power window 3 occurred, based on this load F(n), with a high accuracy.

Further, in the microcomputer 100 according to this embodiment, the determination value adjusting unit 110 can increase the pinch determination value Fth for the first period (N_high [count]), when the local maximum value of the acceleration term exceeds the first threshold value (Facc_high_peak) during the certain period after starting the motor 4, and can increase the pinch determination value Fth for the second period (N_middle [count]) which is shorter than the first period, when the local maximum value of the acceleration term exceeds the second threshold value (Facc_middle_peak) which is smaller than the first threshold value.

Accordingly, the microcomputer 100 according to this embodiment can evaluate the possibility that no pinching of a foreign object occurred, from the local maximum value of the acceleration term, and vary the period in which the pinch determination value Fth is increased according to the possibility that no pinching of the foreign object occurred. For this reason, the microcomputer 100 according to this embodiment can reduce the erroneous determination that the pinching by the power window 3 occurred, while reducing deterioration of the accuracy of detecting the pinching by the power window 3.

Further, in the microcomputer 100 according to this embodiment, the determination value adjusting unit 110 can increase the pinch determination value Fth every time the local maximum value of the acceleration term exceeds the predetermined threshold value during the certain period after starting the motor 4.

Hence, the microcomputer 100 according to this embodiment can increase the pinch determination value Fth a plurality of times, as required, during the certain period after starting the motor 4.

In addition, in the microcomputer 100 according to this embodiment, the determination value adjusting unit 110 can detect the second acceleration term Facc(n−1) as the local maximum value of the acceleration term, when the second acceleration term Facc(n−1), among the three consecutive acceleration terms Facc(n−2), Facc(n−1), and Facc(n) computed by the load computing unit 106, is larger than both the first acceleration term Facc(n−2) and the third acceleration term Facc(n).

As a result, the microcomputer 100 according to this embodiment can detect the local maximum value of the acceleration term in a relatively easy manner.

Moreover, in the microcomputer 100 according to this embodiment, when the acceleration term becomes less than or equal to the predetermined reference value (Facc_baseline) for determining that the angular acceleration of the motor 4 has switched from deceleration to acceleration, the determination value adjusting unit 110 can increase the pinch determination value Fth for the third period (Nacc_wait_count) from this timing when the acceleration term becomes less than or equal to the predetermined reference value (Facc_baseline).

Accordingly, when the angular acceleration of the rotating shaft of the motor 4 switches from deceleration to acceleration due to the slackness of the regulator of the power window 3, for example, the microcomputer 100 according to this embodiment can temporarily increase the pinching determination value Fth, because it is highly likely that no pinching of the foreign object by the power window 3 occurred, thereby reducing the erroneous determination that the pinching by the power window 3 occurred.

In the microcomputer 100 according to this embodiment, the predetermined reference value (Factc_baseline) may be 0.

Accordingly, when the acceleration term has the negative polarity, the microcomputer 100 according to this embodiment can increase the pinching determination value Fth, because it is highly likely that no pinching of the foreign object by the power window 3 occurred, thereby reducing the erroneous determination that the pinching by the power window 3 occurred.

Although one embodiment of the present invention is described above in detail, the present invention is not limited to these embodiments, and various variations and modifications may be made within the scope of the present invention as defined in the appended claims.

For example, in one embodiment of the present invention, the power window 3 is used as an example of the open/close body, which is a target to be controlled by the microcomputer 100, however, the open/close body, which is the target to be controlled, may be any open/close body which at least performs the open/close operation by being driven by a motor, such as other open/close bodies provided in the vehicle, such as a sunroof, a sliding door, or the like, and open/close bodies (for example, an electric shutter, or the like) provided in places other than the vehicle, or the like.

Hereinafter, a modification of the processes of the microcomputer 100 will be described.

(Modification of Procedures of Processes of Microcomputer 100)

Figure 14:
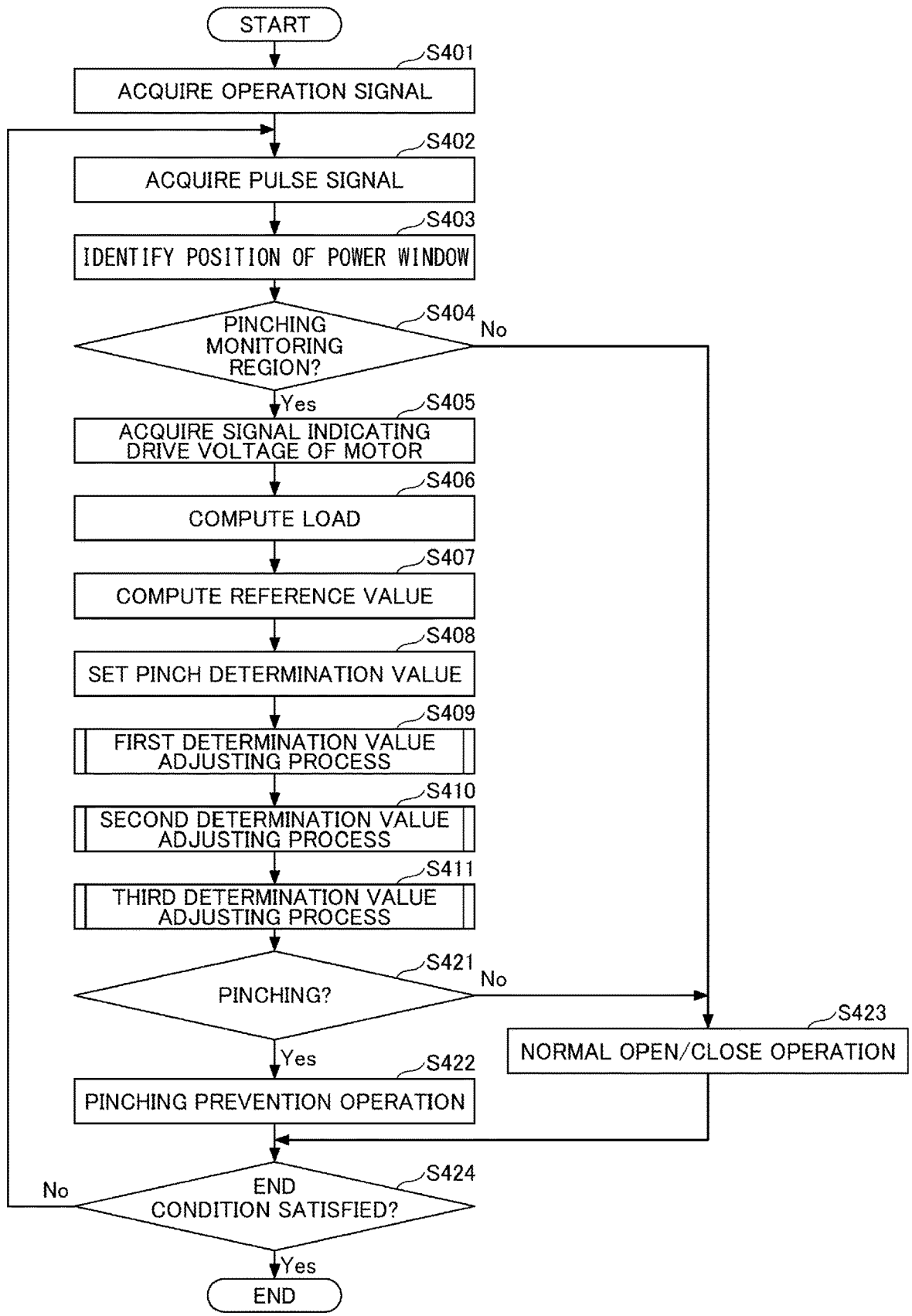
FIG. 14 is a flow chart illustrating a modification of the procedures of the processes of the microcomputer according to one embodiment of the present invention.

FIG. 14 is a flow chart illustrating a modification of the procedures of the processes of the microcomputer 100 according to one embodiment of the present invention. The series of processes illustrated in FIG. 14 differs from the series of processes illustrated in FIG. 4, in that a third start-up determination value adjusting process (step S411) by the determination value adjusting unit 110 is further included after the process of step S410.

In other words, in the process illustrated in FIG. 14, the determination value adjusting unit 110 performs the first start-up determination value adjusting process, the second start-up determination value adjusting process, and the third start-up determination value adjusting process (steps S409 through S411). Accordingly, when the acceleration term becomes less than or equal to the predetermined reference value, when the local maximum value of the acceleration term exceeds the predetermined threshold value, and when the computed value of the current acceleration term becomes less than or equal to the computed value of the acceleration term of 4 counts before by the predetermined value (Facc_init_drop) or more, the determination value adjusting unit 110 temporarily increases the pinch determination value Fth during the threshold increase determination period immediately after starting the motor 4. Details of the procedures of the third start-up determination value adjusting process will be described later with reference to FIG. 15.

(Procedures of Third Start-up Determination Value Adjusting Process)

FIG. 15 is a flow chart illustrating the procedures of the third start-up determination value adjusting process by the determination value adjusting unit 110 according to one embodiment of the present invention. FIG. 15 illustrates, in detail, the procedures of the third start-up determination value adjusting process (step S411) by the determination value adjusting unit 110, in the flow chart illustrated in FIG. 14. In particular, FIG. 15 illustrates the procedures of the third start determination value adjusting process performed by the determination value adjusting unit 110, during the period from the time when the motor 4 is started to the time when the rotation of the motor 4 stabilizes.

In the third start-up determination value adjusting process, the following variables and constants are used.

n: Pulse count value from the start of the motor 4 n_start: Pulse count value indicating the beginning of the threshold increase determination period n_end: Pulse count value indicating the end of the threshold escalation determination period Facc(n): Computed value of the acceleration term for the pulse count value n Facc_init_drop: Threshold value of decrease in the computed value of the acceleration term $\Delta$Fth: Variable indicating the increment of the pinch determination value Fth $\Delta$Fth_acc_init_drop: Set value of the increment of the pinch determination value Fth count: Number of counts indicating the duration of the fourth period in which the pinch determination value Fth is increased Nacc_init_drop: Number of counts defining a length of the fourth period in which the pinch determination value Fth is increased First, the determination value adjusting unit 110 determines whether or not a condition {n_start<=n<=n_end} is satisfied (step S1501). The condition {n_start<=n<=n_end} is used to determine whether or not a timing is within the threshold increment determination period. For example, as an example of a suitable value, "25" is set to n_start, and "90" is set to n_end (but not limited thereto). n is the pulse count value indicating the open/close position of the power window 3 from the start of the motor identified in step S403 illustrated in FIG. 4.

When it is determined in step S1501 that the condition {n_start<=n<=n_end} is not satisfied (No in step S1501), the determination value adjusting unit 110 ends a series of processes illustrated in FIG. 15.

On the other hand, when it is determined in step S1501 that the condition {n_start<=n<=n_end} is satisfied (Yes in step S1501), the determination value adjusting unit 110 determines whether or not a condition {Facc(n−4)−Facc(n) >=$\Delta$Facc_init_drop} is satisfied (step S1502). The condition {Facc(n−4)−Facc(n)>=Facc_init_drop} is used to determine whether or not the computed value of the current acceleration term decreased from the computed value of the acceleration term of 4 counts before by the predetermined value (Facc_init_drop) or more, for example. Although the computed value of 4 counts before is used in this example, the computed value is not limited thereto.

When it is determined in step S1502 that a condition {Facc(n−4)−Facc(n)>=ΔFacc_init_drop} is not satisfied (No in step S1502), the determination value adjusting unit 110 advances the process to step S1504.

On the other hand, when it is determined in step S1502 that the condition {Facc(n−4)−Facc(n)>=ΔFacc_init_drop} is satisfied (Yes in step S1502), the determination value adjusting unit 110 substitutes the constant ΔFth_acc_init_drop into the variable ΔFth, and substitutes "0" into the variable count (step S1503). ΔFth_acc_init_drop indicates the increment with respect to the pinch determination value Fth. An appropriate value for ΔFth_acc_init_drop is obtained in advance by a simulation or the like, and is set to the microcomputer 100. For example, as an example of a suitable value, "85 [N]" (but not limited thereto) is set to ΔFth_acc_init_drop. Then, the determination value adjusting unit 110 advances the process to step S1504.

In step S1504, the determination value adjusting unit 110 adds "1" to the variable count. Next, the determination value adjusting unit 110 determines whether or not a condition {count>Nacc_init_drop} is satisfied (step S1505). The condition {count>Nacc_init_drop} is used to determine whether or not the period in which the pinch determination value Fth is increased has reached the end of the period. For example, as an example of a suitable value, "30" (but not limited to) is set to Nacc_init_drop.

When it is determined in step S1505 that the condition {count>Nacc_init_drop} is not satisfied (No in step S1505), the determination value adjusting unit 110 ends the series of processes illustrated in FIG. 15.

On the other hand, when it is determined in step S1505 that the condition {count>Nacc_init_drop} is satisfied (Yes in step S1505), the determination value adjusting unit 110 substitutes "0" into the variable ΔFth (step S1506), and ends the series of processes illustrated in FIG. 15.

By the series of processes illustrated in FIG. 15, the microcomputer 100 according to this embodiment can increase the pinch determination value Fth by a predetermined amount and for a certain period, when the computed value of the current acceleration term decreased from the computed value of the acceleration term of 4 counts before by the predetermined value (Facc_init_drop) or more (that is, when the angular acceleration of the motor 4 is sharply decreased) during the threshold increase determination period which is set to the period in which the rotation of the motor 4 is unstable, by regarding this phenomenon as a peculiar event that occurs during the period, immediately after starting the motor 4, in which the rotation of the motor 4 is unstable when no pinching by the power window 3 occurs.

Hence, the microcomputer 100 according to this embodiment can increase the pinch determination value Fth so that the value of the load F(n) does not exceed the pinch determination value Fth, even when the value of the load F(n) computed by the load computing unit 106 is temporarily increased due to the unstable operation of the motor 4 even though no pinching by the power window 3 occurs during the period immediately after the start of the motor 4 until the rotation of the motor 4 stabilizes. For this reason, the microcomputer 100 according to this embodiment can prevent the erroneous determination that the pinching by the power window 3 occurred.

(Example of Change in Acceleration Term)

Figure 16:
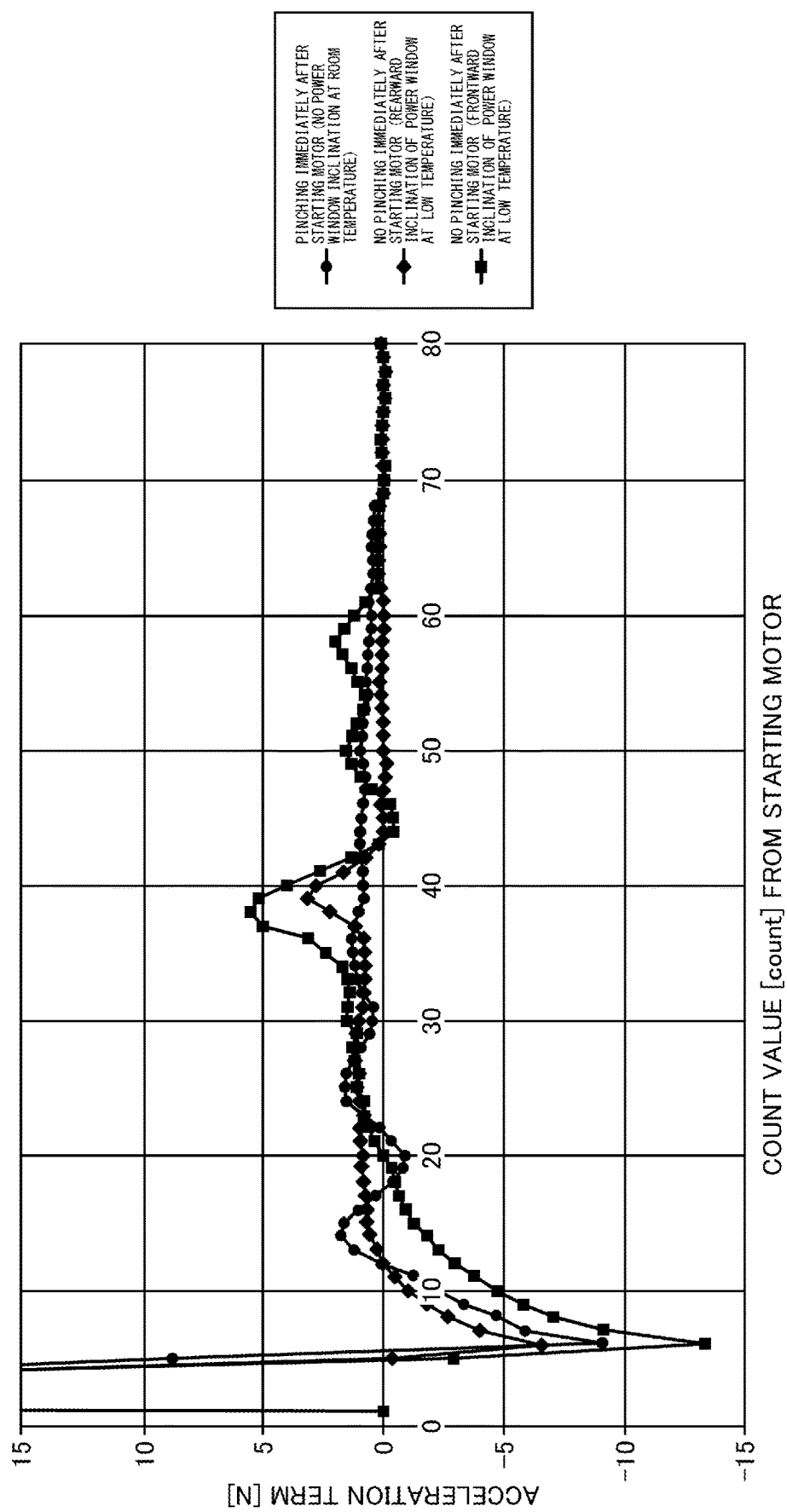
FIG. 16 is a diagram illustrating an example of a change in the acceleration term computed by the microcomputer according to one embodiment of the present invention.

FIG. 16 is a diagram illustrating an example of a change in the acceleration term computed by the microcomputer 100 according to one embodiment of the present invention. FIG. 16 illustrates the change in acceleration term from the start of the power window 3, for the case where the pinching by the power window 3 occurs, and for the case where no pinching by the power window 3 occurs.

As illustrated by plots of circular marks in FIG. 16, when the pinching by the power window 3 occurs immediately after the starting of the motor 4 with no power window inclination at room temperature, a period in which the acceleration term greatly decreases is not generated, because there is no large up and down movement of the acceleration term.

On the other hand, as illustrated by plots of rectangular marks in FIG. 16, when no pinching by the power window 3 occurs immediately after the starting of the motor 4 with power window inclination at low temperature (plots of rhombic marks indicate rearward inclination, while plots of square marks indicate forward inclination), the period in which the acceleration term greatly decreases (38th to 44th counts in the example illustrated in FIG. 16) is generated, because a large up and down movement of the acceleration term occurs due to the slackness or the like of the regulator of the power window 3. This period in which the acceleration term greatly decreases indicates that the angular acceleration of the motor 4 sharply decreased.

In view of the different characteristics of the acceleration term, the microcomputer 100 according to this embodiment performs the third determination value adjusting process, as illustrated in FIG. 14 and FIG. 15, so that it is possible to prevent the erroneous detection of the pinching by the power window 3, by increasing the pinch determination value Fth when the period in which the acceleration term greatly decreases is generated.

(Fourth Exemplary Implementation of Control by Microcomputer 100)

Figure 17:
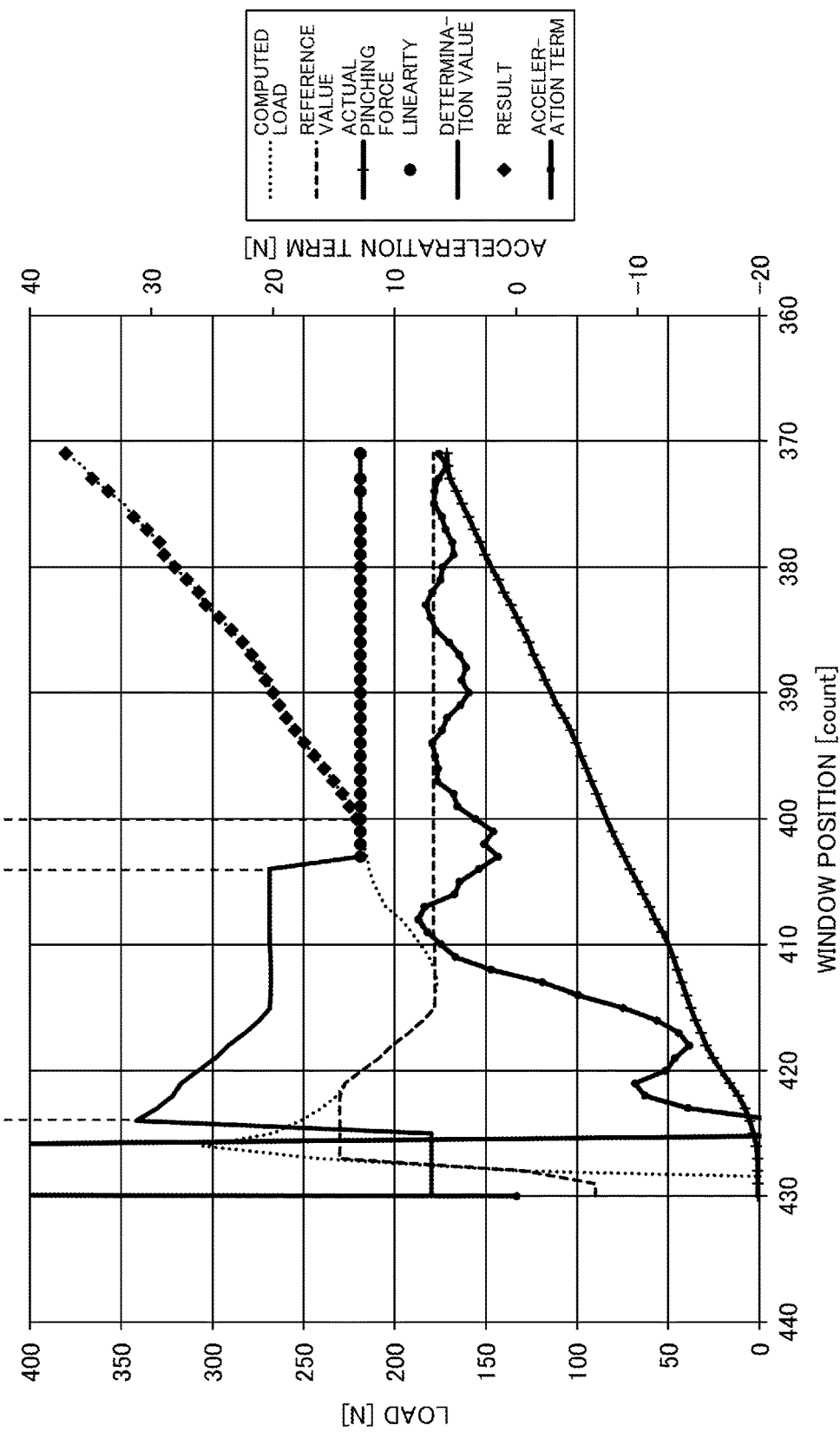
FIG. 17 is a diagram illustrating a fourth exemplary implementation of the control by the microcomputer according to one embodiment of the present invention.

FIG. 17 is a diagram illustrating a fourth exemplary implementation of the control by the microcomputer 100 according to one embodiment of the present invention. A graph illustrated in FIG. 17 indicates the change in the various computed values (acceleration term, load, or the like) computed by the microcomputer 100 according to this embodiment, when the pinching by the power window 3 occurs and no rattle of the power window 3 occurs. In FIG. 17, a timing t41 indicates the start timing of the first start-up determination value adjusting process. In addition, a timing t42 indicates the end timing of the first start-up determination value adjusting process.

As illustrated in FIG. 17, in the fourth exemplary implementation, because the acceleration term becomes less than or equal to the predetermined reference value Facc_baseline at the timing t41, the pinch determination value Fth is increased by a predetermined amount by the first start-up determination value adjusting process. Then, at the timing t42 after the predetermined third period elapses, the pinch determination value Fth is returned back to its original value. Further, at the timing t43 immediately thereafter, because the load F(n) exceeds the pinch determination value Fth, the determination unit 111 determines at this timing that "the pinching by the power window 3 occurred".

In the fourth exemplary implementation, although the pinch determination value Fth is increased as described above immediately after starting the motor, it was confirmed that the pinching by the power window 3 can be detected at a relatively early timing, because the pinch determination value Fth is immediately returned back to its original value.

(Fifth Exemplary Implementation of Control by Microcomputer 100)

Figure 18:
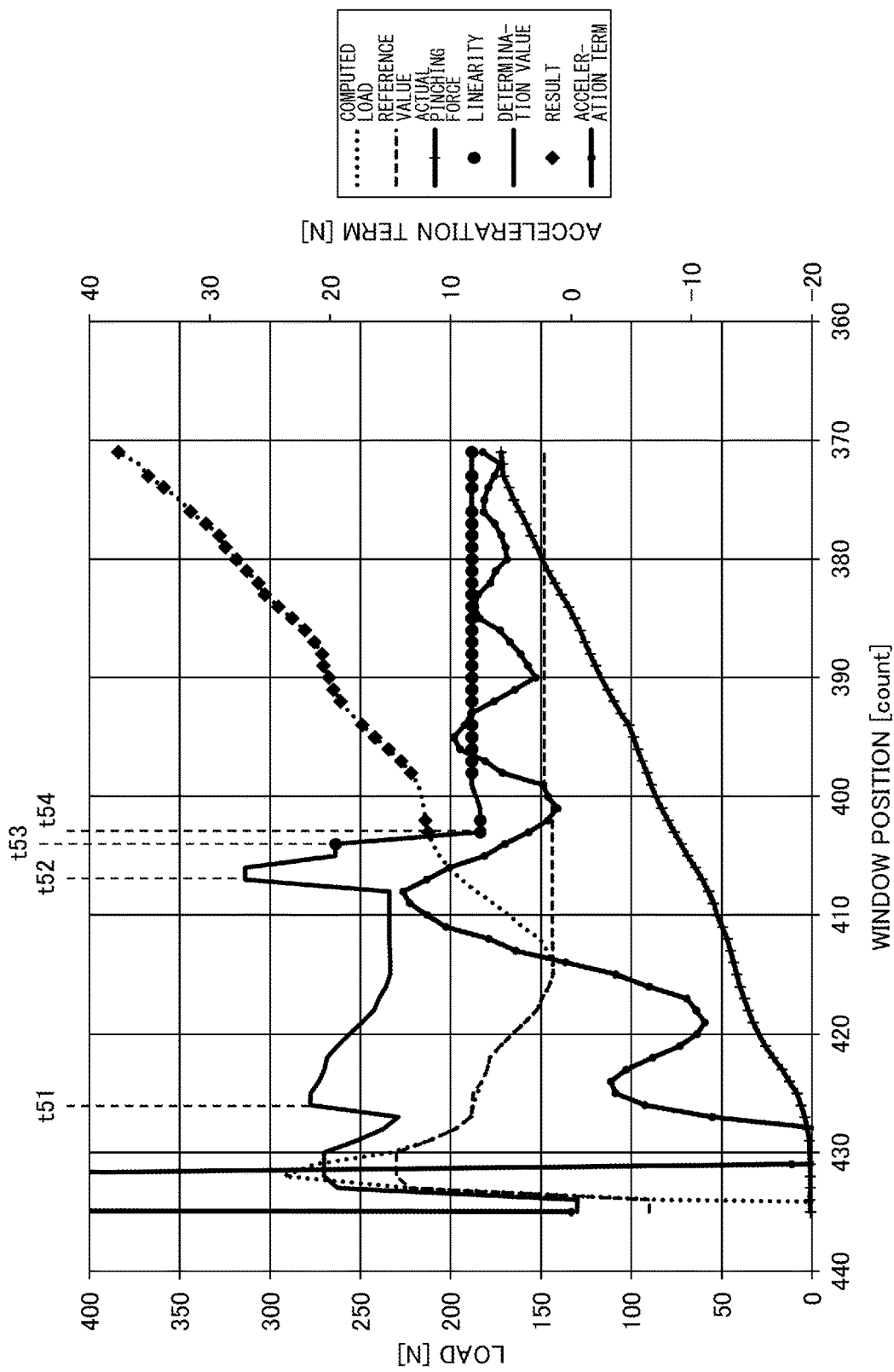
FIG. 18 is a diagram illustrating a fifth exemplary implementation of the control by the microcomputer according to one embodiment of the present invention.

FIG. 18 is a diagram illustrating a fifth exemplary implementation of the control by the microcomputer 100 according to one embodiment of the present invention. A graph illustrated in FIG. 18 indicates the change in the various computed values (acceleration term, load, or the like) computed by the microcomputer 100 according to this embodiment, when the pinching by the power window 3 occurs and the rattle of the power window 3 occurs. In FIG. 18, a timing t51 indicates the start timing of the first start-up determination value adjusting process. In addition, a timing t52 indicates the start timing of the second start-up determination value adjusting process. Moreover, a timing t53 indicates the end timing of the first start-up determination value adjusting process. Further, a timing t54 indicates the end timing of the second start-up determination value adjusting process.

As illustrated in FIG. 18, in the fifth exemplary implementation, because the acceleration term becomes less than or equal to the predetermined reference value Facc_baseline at the timing t51, the pinch determination value Fth is increased by a predetermined amount by the first start-up determination value adjusting process. In addition, because the local maximum value (Facc_peak) of the acceleration term exceeds the predetermined second threshold value (Facc_middle_peak) at the timing t52, the pinch determination value Fth is further increased by a predetermined amount by the second start-up determination value adjusting process.

Then, at the timing t53 after the predetermined third period elapses, the increment of the pinch determination value Fth by the first start-up determination value adjusting process is canceled, and further, at the timing t54 after the predetermined second period elapses, the increment of the pinch determination value Fth by the second start-up determination value adjusting process is canceled. At the same time, because the load F(n) exceeds the pinch determination value Fth, the determination unit 111 determines at this timing that "the pinching by the power window 3 occurred".

In the fifth exemplary implementation, although the pinch determination value Fth is increased as described above immediately after starting the motor, it was confirmed that the pinching by the power window 3 can be detected at a relatively early timing, because the pinch determination value Fth is immediately returned back to its original value.

(Sixth Exemplary Implementation of Control by Microcomputer 100)

Figure 19:
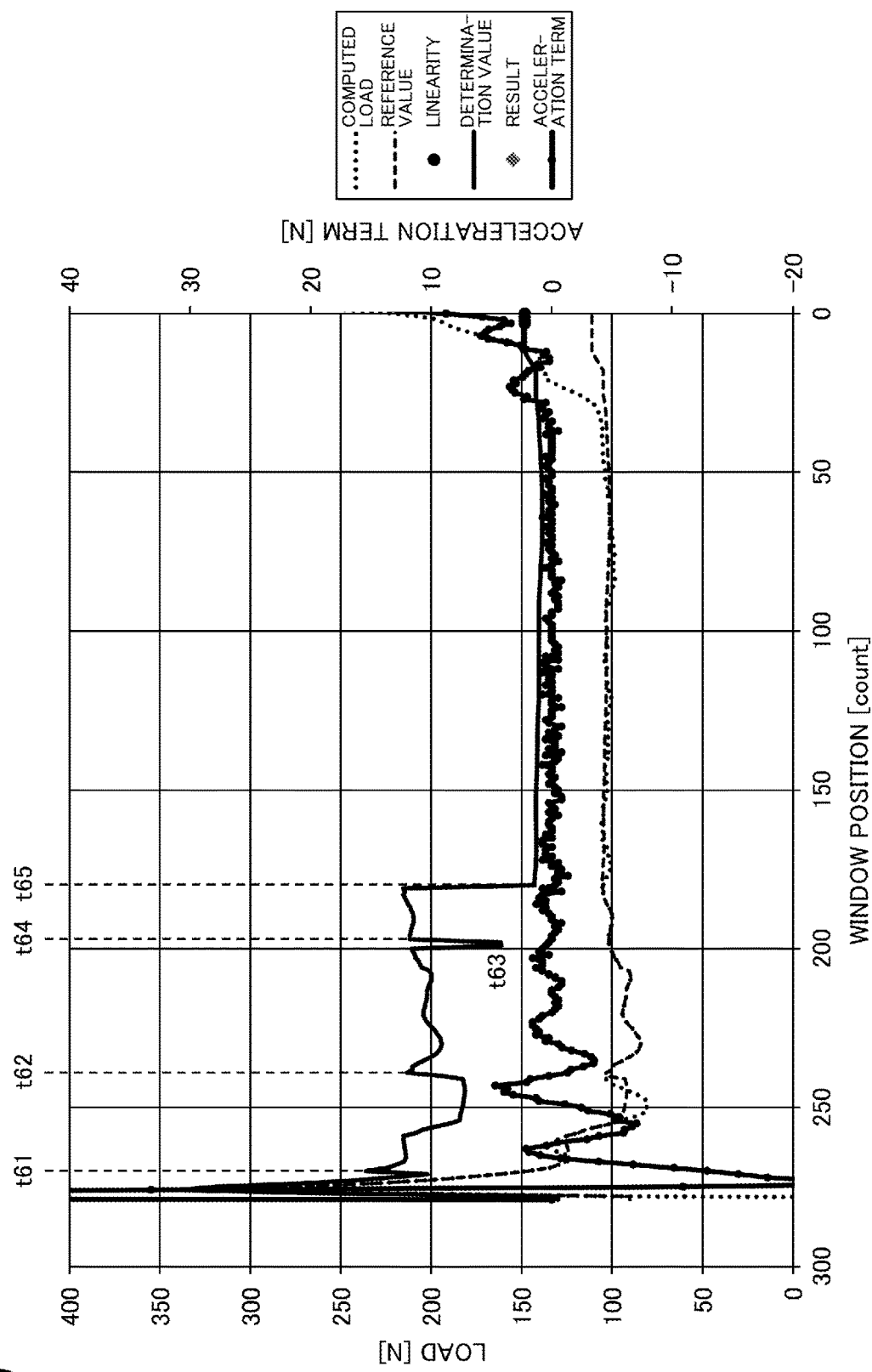
FIG. 19 is a diagram illustrating a sixth exemplary implementation of the control by the microcomputer according to one embodiment of the present invention.

FIG. 19 is a diagram illustrating a sixth exemplary implementation of the control by the microcomputer 100 according to one embodiment of the present invention. A graph illustrated in FIG. 19 indicates the change in the various computed values (acceleration term, load, or the like) computed by the microcomputer 100 according to this embodiment, when no pinching by the power window 3 occurs. In FIG. 19, a timing t61 indicates the start timing of the first start-up determination value adjusting process. In addition, a timing t62 indicates the start timing of the third start-up determination value adjusting process. Moreover, a timing t63 indicates the end timing of the first start-up determination value adjusting process. Further, a timing t64 indicates a restart timing of the first start-up determination value adjusting process. In addition, a timing t65 indicates the end timing of the first start-up determination value adjusting process and the third start-up determination value adjusting process.

As illustrated in FIG. 19, in the sixth exemplary implementation, because the acceleration term becomes less than or equal to the predetermined reference value Facc_baseline at the timing t61, the pinch determination value Fth is increased by a predetermined amount by the first start-up determination value adjusting process (first time). Further, because the computed value of the current acceleration term at timing t62 decreases from the computed value of the acceleration term of 4 counts before by the predetermined value (Facc_init_drop) or more, the pinch determination value Fth is further increased by a predetermined amount by the third start-up determination value adjusting process.

Then, at the timing t63 after the predetermined third period elapses, the increment of the pinch determination value Fth by the first start-up determination value adjusting process (first process) is canceled.

Thereafter, because the acceleration term again becomes less than or equal to the predetermined reference value Facc_baseline at the timing t64, the pinch determination value Fth is increased by a predetermined amount by the first start-up determination value adjusting process (second time).

Furthermore, at the timing t65 after the predetermined third period elapses and the predetermined fourth period elapses, the increment of the pinch determination value Fth by the first start-up determination value adjusting process (second time), and the increment of the pinch determination value Fth by the third start-up determination value adjusting process, are canceled.

In this sixth exemplary implementation, because the pinch determination value Fth is increased appropriately as described above, it was confirmed that the load F(n) will not exceed the pinch determination value Fth, and for this reason, the erroneous determination that the pinching by the power window 3 occurred can be prevented.

(Seventh Exemplary Implementation of Control by Microcomputer 100)

Figure 20:
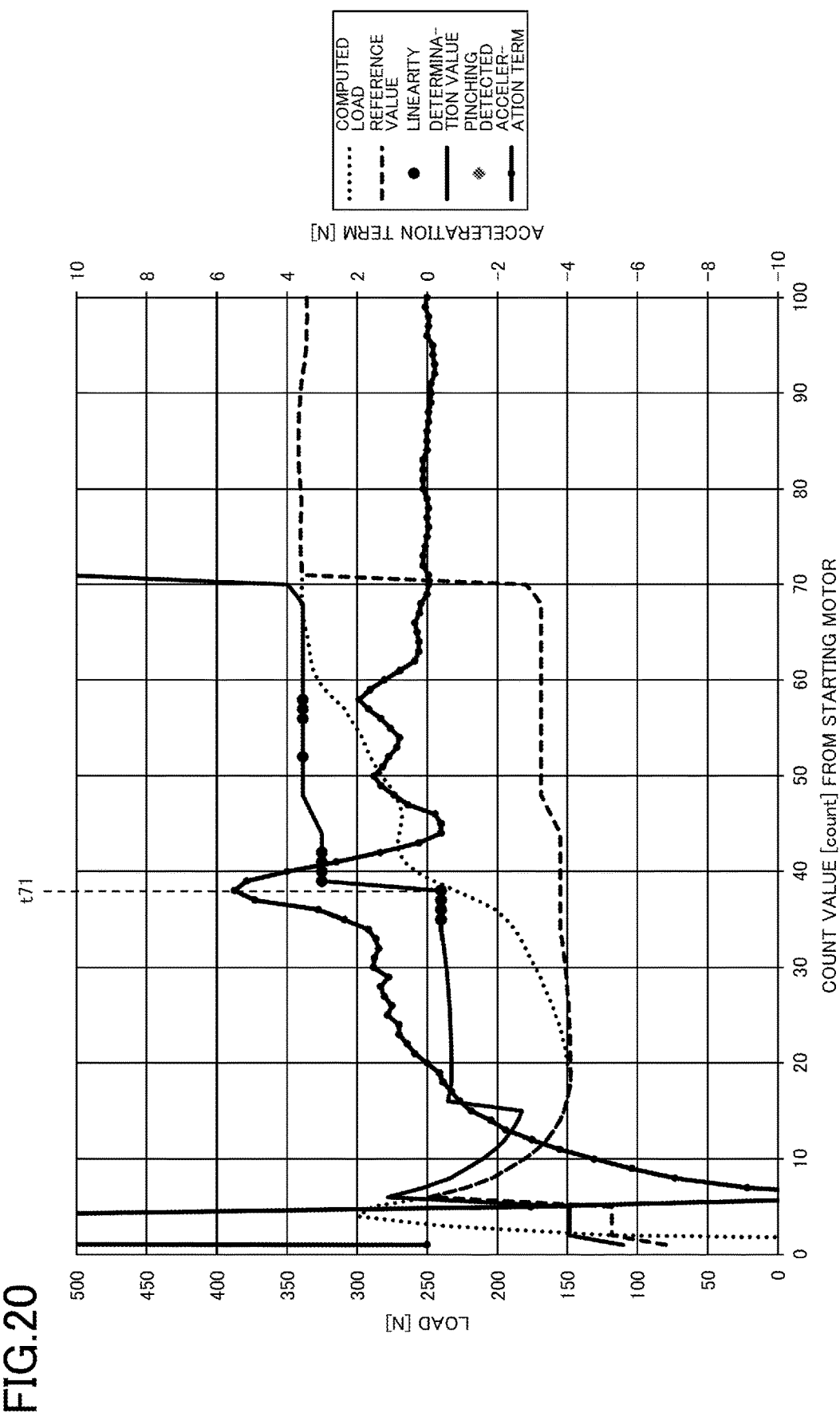
FIG. 20 is a diagram illustrating a seventh exemplary implementation of the control by the microcomputer according to one embodiment of the present invention.

FIG. 20 is a diagram illustrating a seventh exemplary implementation of the control by the microcomputer 100 according to one embodiment of the present invention. A graph illustrated in FIG. 20 indicates the change in the various computed values (acceleration term, load, or the like) computed by the microcomputer 100 according to this embodiment, when no pinching by the power window 3 occurs, and until the power window 3 reaches the fully closed state. In FIG. 20, a timing t71 indicates the start timing of the third start-up determination value adjusting process.

As illustrated in FIG. 20, in the seventh exemplary implementation, because the computed value of the current acceleration term decreases from the computed value of the acceleration term of 4 counts before by the predetermined value (Facc_init_drop) or more at the timing t71, the pinch determination value Fth is increased by a predetermined amount by the third start-up determination value adjusting process.

In this seventh exemplary implementation, because the pinch determination value Fth is increased appropriately as described above, it was confirmed that the load F(n) will not exceed the pinch determination value Fth, and for this reason, the erroneous determination that the pinching by the power window 3 occurred can be prevented.

As described above, the microcomputer 100 according to this embodiment includes the load computing unit 106 which computes the acceleration term Facc(n) based on a change in the rotational period of the motor 4, and the load F(n) applied to the motor 4 based on the acceleration term Facc(n), based on the signal indicating the rotational period of the motor 4, the determination unit 111 which determines that the pinching by the power window 3 occurred when the load F(n) computed by the load computing unit 106 exceeds the pinch determination value Fth, and the determination value adjusting unit 110 which increases the pinch determination Fth during a period from a timing when the amount of decrease of the acceleration term Facc(n) per predetermined unit time exceeds a predetermined threshold value during a certain period after starting the motor 4.

Accordingly, the microcomputer 100 according to this embodiment can detect a peculiar phenomenon in which "the amount of decrease of the acceleration term Facc(n) per predetermined unit time exceeds the predetermined threshold value", which occurs when the power window 3 is driven through the regulator which may include slackness and no pinching by the power window 3 occurs, and when this phenomenon is detected, the microcomputer 100 temporarily increases the pinch determination value Fth so that the load F(n) is unlikely to exceed the pinch determination value Fth. For this reason, the microcomputer 100 according to this embodiment can prevent the erroneous determination of the pinching by the power window 3 when no pinching by the power window 3 occurs. Hence, the microcomputer 100 according to this embodiment can increase the accuracy of determining the pinching of an object immediately after the start of the motor 4.

According to the embodiments and exemplary implementations, it is possible to increase the accuracy of determining the pinching of the object immediately after the motor is started.

The present invention is not limited to the structures or the like of the embodiments illustrated above, and combinations with other elements may be made. In this respect, all examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An open/close control device which detects pinching by an open/close body due to driving of a motor, comprising:
    a storage device configured to store a program; and
    a processor configured to execute the program stored in the storage device, the program which, when executed by the processor, causing the processor to perform a process including
        computing an acceleration term based on a change in a rotational period of the motor, and a load applied to the motor based on the acceleration term, based on a signal indicating the rotation period of the motor,
        determining that the pinching by the open/close body occurred, when the load computed by the computing exceeds a predetermined determination value, and
        adjusting the determination value by increasing the determination value when a local maximum value of the acceleration term exceeds a predetermined threshold value during a certain period immediately after starting the motor,
    wherein the adjusting includes
        increasing the determination value for a first period when the local maximum value of the acceleration term exceeds a first threshold value, and increasing the determination value for a second period shorter than the first period when the local maximum value of the acceleration term is less than the first threshold value and exceeds a second threshold value smaller than the first threshold value, during the certain period immediately after starting the motor.

2. An open/close control device which detects pinching by an open/close body due to driving of a motor, comprising;
    a storage device configured to store a program; and
    a processor configured to execute the program stored in the storage device, the program which, when executed by the processor, causing the processor to perform a process including
        computing an acceleration term based on a change in a rotational period of the motor, and a load applied to the motor based on the acceleration term, based on a signal indicating the rotation period of the motor,
        determining that the pinching by the open/close body occurred, when the load computed by the computing exceeds a predetermined determination value, and
        adjusting the determination value by increasing the determination value when a local maximum value of the acceleration term exceeds a predetermined threshold value during a certain period immediately after starting the motor,
    wherein the computing includes
        computing the acceleration term, and a torque term based on a voltage applied to the motor and the rotational period of the motor, to compute the load applied to the motor by adding the torque term to the acceleration term.

3. The open/close control device as claimed in claim 2, wherein the adjusting includes
    increasing the determination value every time the local maximum value of the acceleration term exceeds a predetermined threshold value during the certain period immediately after starting the motor.

4. The open/close control device as claimed in claim 2, wherein the adjusting includes
    detecting a second acceleration term as a local maximum value of the acceleration term when, among three consecutive acceleration terms computed by the computing, the second acceleration term is larger than both a first acceleration term and a third acceleration term.

5. The open/close control device as claimed in claim 2, wherein the adjusting includes
    increasing the determination value for a third period from a timing when the acceleration term becomes less than or equal to a predetermined reference value for determining that an acceleration of the motor switched from deceleration to acceleration.

6. The open/close control device as claimed in claim 5, wherein the predetermined reference value is 0.

7. The open/close control device as claimed in claim 2, wherein the open/close body is a power window of a vehicle.

8. An open/close control device which detects pinching by an open/close body due to driving of a motor, comprising:
a storage device configured to store a program; and
a processor configured to execute the program stored in the storage device, the program which, when executed by the processor, causing the processor to perform a process including
computing an acceleration term based on a change in a rotational period of the motor, and a load applied to the motor based on the acceleration term, based on a signal indicating the rotation period of the motor,
determining that the pinching by the open/close body occurred, when the load computed by the computing exceeds a predetermined determination value, and
adjusting the determination value by increasing the determination value when a local maximum value of the acceleration term exceeds a predetermined threshold value during a certain period immediately after starting the motor,
wherein the adjusting includes
further increasing the determination value for a fourth period from a timing when an amount of decrease of the acceleration term per predetermined unit time exceeds a predetermined threshold value, during the certain period immediately after starting the motor.

9. The open/close control device as claimed in claim 8, wherein the adjusting includes
further increasing the determination value when the amount of decrease of the acceleration term per predetermined unit time exceeds the predetermined threshold value after increasing the determination value due to the local maximum value of the acceleration term exceeding a predetermined threshold value, during the certain period immediately after starting the motor.

10. An open/close control method which detects pinching by an open/close body due to driving of a motor, comprising:
computing an acceleration term based on a change in a rotational period of the motor, and a load applied to the motor based on the acceleration term, based on a signal indicating the rotation period of the motor;
determining that the pinching by the open/close body occurred, when the load computed by the computing exceeds a predetermined determination value; and
adjusting the determination value by increasing the determination value when a local maximum value of the acceleration term exceeds a predetermined threshold value during a certain period immediately after starting the motor,
wherein the adjusting includes
increasing the determination value for a third period from a timing when the acceleration term becomes less than or equal to a predetermined reference value for determining that an acceleration of the motor switched from deceleration to acceleration.

11. The open/close control method as claimed in claim 10, wherein the computing includes
computing the acceleration term, and a torque term based on a voltage applied to the motor and the rotational period of the motor, to compute the load applied to the motor by adding the torque term to the acceleration term.

12. The open/close control method as claimed in claim 10, wherein the adjusting includes
increasing the determination value for a first period when the local maximum value of the acceleration term exceeds a first threshold value, and increasing the determination value for a second period shorter than the first period when the local maximum value of the acceleration term is less than the first threshold value and exceeds a second threshold value smaller than the first threshold value, during the certain period immediately after starting the motor.

13. The open/close control method as claimed in claim 10, wherein the adjusting includes
increasing the determination value every time the local maximum value of the acceleration term exceeds a predetermined threshold value during the certain period immediately after starting the motor.

14. The open/close control method as claimed in claim 10, wherein the adjusting includes
detecting a second acceleration term as a local maximum value of the acceleration term when, among three consecutive acceleration terms computed by the computing, the second acceleration term is larger than both a first acceleration term and a third acceleration term.

* * * * *